(12) United States Patent
Johnston et al.

(10) Patent No.: US 10,774,590 B2
(45) Date of Patent: Sep. 15, 2020

(54) DISTRIBUTED WELL ENGINEERING AND PLANNING

(71) Applicant: Schlumberger Technology Corporation, Sugar Land, TX (US)

(72) Inventors: Lucian Johnston, Sugar Land, TX (US); Mark S. Passolt, Hansville, WA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 288 days.

(21) Appl. No.: 15/566,152

(22) PCT Filed: Apr. 15, 2016

(86) PCT No.: PCT/US2016/027783
§ 371 (c)(1),
(2) Date: Oct. 12, 2017

(87) PCT Pub. No.: WO2016/168622
PCT Pub. Date: Oct. 20, 2016

(65) Prior Publication Data
US 2018/0087321 A1  Mar. 29, 2018

(30) Foreign Application Priority Data

Apr. 17, 2015 (CN) .......................... 2015 1 0185631

(51) Int. Cl.
| | |
|---|---|
| *E21B 7/04* | (2006.01) |
| *G05B 19/02* | (2006.01) |
| *G06Q 10/06* | (2012.01) |
| *E21B 43/00* | (2006.01) |

(52) U.S. Cl.
CPC ............... *E21B 7/04* (2013.01); *G05B 19/02* (2013.01); *G06Q 10/06* (2013.01); *E21B 43/00* (2013.01)

(58) Field of Classification Search
None
See application file for complete search history.

(56) References Cited

U.S. PATENT DOCUMENTS

| | | | | |
|---|---|---|---|---|
| RE33,751 E | * | 11/1991 | Geczy .................... | E21B 7/067 175/61 |
| 9,518,434 B1 | * | 12/2016 | Champness ............ | E21B 21/01 |
| 2002/0103630 A1 | * | 8/2002 | Aldred .................... | E21B 44/00 703/10 |

(Continued)

OTHER PUBLICATIONS

International Search report and written opinion issued in the related PCT application PCT/US2016/027783, dated Jul. 26, 2016 (17 pages).

*Primary Examiner* — Kibrom K Gebresilassie
(74) *Attorney, Agent, or Firm* — Alec J. McGinn

(57) ABSTRACT

A method can include asynchronously receiving a well trajectory as part of a well plan, a fluid plan as part of the well plan and a bottom hole assembly plan as part of the well plan where the well trajectory is based at least in part on information associated with a geologic environment; asynchronously determining coherency metrics as to dependencies between the well trajectory, the fluid plan and the bottom hole assembly plan; and, based at least in part on the coherency metrics, issuing one or more messages that call for adjusting one or more of the well trajectory, the fluid plain and the bottom home assembly plan.

20 Claims, 12 Drawing Sheets

(56) References Cited

U.S. PATENT DOCUMENTS

| | | | |
|---|---|---|---|
| 2007/0067147 A1 | 3/2007 | Huang | |
| 2009/0152005 A1* | 6/2009 | Chapman | E21B 7/00 |
| | | | 175/24 |
| 2009/0157361 A1 | 6/2009 | Toghi et al. | |
| 2010/0185395 A1* | 7/2010 | Pirovolou | E21B 44/00 |
| | | | 702/9 |
| 2010/0191516 A1* | 7/2010 | Benish | E21B 43/00 |
| | | | 703/10 |
| 2011/0028357 A1* | 2/2011 | Abad | C09K 8/03 |
| | | | 507/219 |
| 2011/0088895 A1* | 4/2011 | Pop | E21B 7/04 |
| | | | 166/254.2 |
| 2013/0146357 A1* | 6/2013 | Lovorn | E21B 21/08 |
| | | | 175/24 |
| 2013/0311147 A1* | 11/2013 | Greenwood | G06F 30/00 |
| | | | 703/1 |
| 2014/0353035 A1* | 12/2014 | Sugiura | E21B 7/04 |
| | | | 175/40 |
| 2015/0286971 A1* | 10/2015 | Contreras Otalvora | |
| | | | G06Q 10/04 |
| | | | 705/7.38 |
| 2016/0003008 A1* | 1/2016 | Uribe | E21B 7/04 |
| | | | 175/50 |
| 2017/0350229 A1* | 12/2017 | Hoehn | E21B 7/04 |
| 2019/0376386 A1* | 12/2019 | Wright | E21B 44/00 |
| 2020/0104544 A1* | 4/2020 | Suryadi | E21B 44/00 |

\* cited by examiner

DISTRIBUTED WELL ENGINEERING AND PLANNING

RELATED APPLICATIONS

This application claims priority to and the benefit of a Patent Application filed with the State Intellectual Property Office (SIPO) of the P.R.C. (CN) having Ser. No. 201510185631.X, filed 17 Apr. 2015, which is incorporated by reference herein.

BACKGROUND

A bore can be drilled into a geologic environment where the bore may be utilized for form a well. A rig may be a system of components that can be operated to form a bore in a geologic environment, to transport equipment into and out of a bore in a geologic environment, etc. As an example, a rig may include a system that can be used to drill a bore and to acquire information about a geologic environment, drilling, etc. As an example, a rig can include one or more of the following components and/or equipment: a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform. As an example, a rig or wellsite equipment may be operated to form a bore according to a plan, which may be a well plan.

SUMMARY

A method can include asynchronously receiving a well trajectory as part of a well plan, a fluid plan as part of the well plan and a bottom hole assembly plan as part of the well plan where the well trajectory is based at least in part on information associated with a geologic environment; asynchronously determining coherency metrics as to dependencies between the well trajectory, the fluid plan and the bottom hole assembly plan; and, based at least in part on the coherency metrics, issuing one or more messages that call for adjusting one or more of the well trajectory, the fluid plan and the bottom hole assembly plan. A system can include one or more processors; memory operatively coupled to the one or more processors; and processor-executable instructions stored in the memory and executable by at least one of the processors to instruct the system to asynchronously receive a well trajectory as part of a well plan, a fluid plan as part of the well plan and a bottom hole assembly plan as part of the well plan where the well trajectory is based at least in part on information associated with a geologic environment, asynchronously determine coherency metrics as to dependencies between the well trajectory, the fluid plan and the bottom hole assembly plan, and, based at least in part on the coherency metrics, issue one or more messages that call for adjusting one or more of the well trajectory, the fluid plan and the bottom hole assembly plan. One or more computer-readable storage media can include computer-executable instructions executable to instruct a computing system to: asynchronously receive a well trajectory as part of a well plan, a fluid plan as part of the well plan and a bottom hole assembly plan as part of the well plan where the well trajectory is based at least in part on information associated with a geologic environment; asynchronously determine coherency metrics as to dependencies between the well trajectory, the fluid plan and the bottom hole assembly plan; and, based at least in part on the coherency metrics, issue one or more messages that call for adjusting one or more of the well trajectory, the fluid plan and the bottom hole assembly plan. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
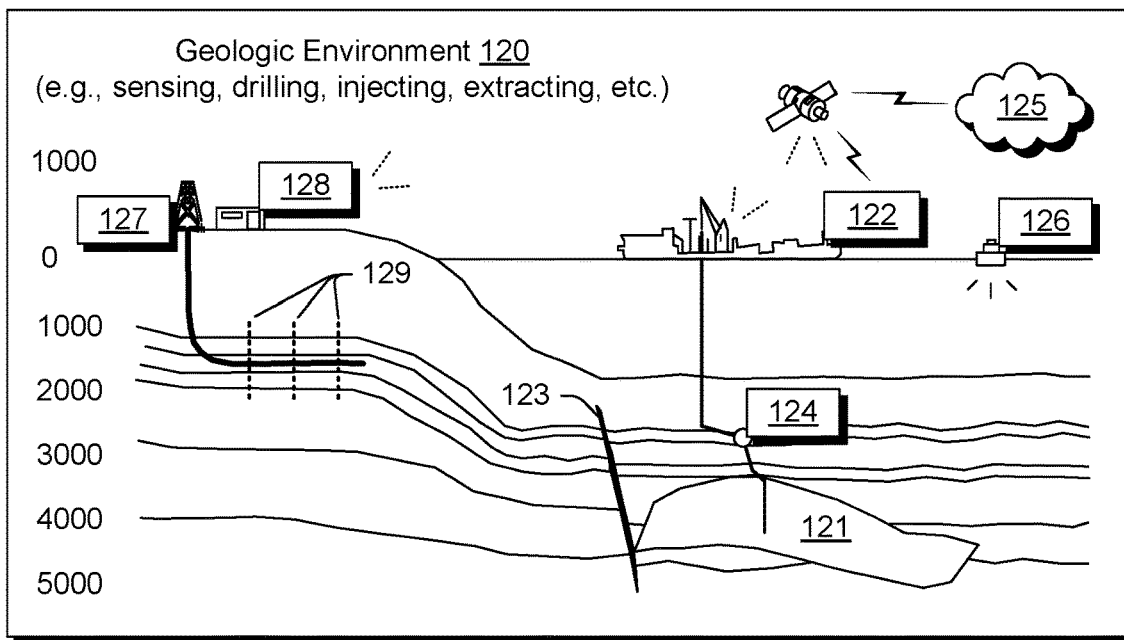
FIG. 1 illustrates examples of equipment in a geologic environment.
Figure 1:
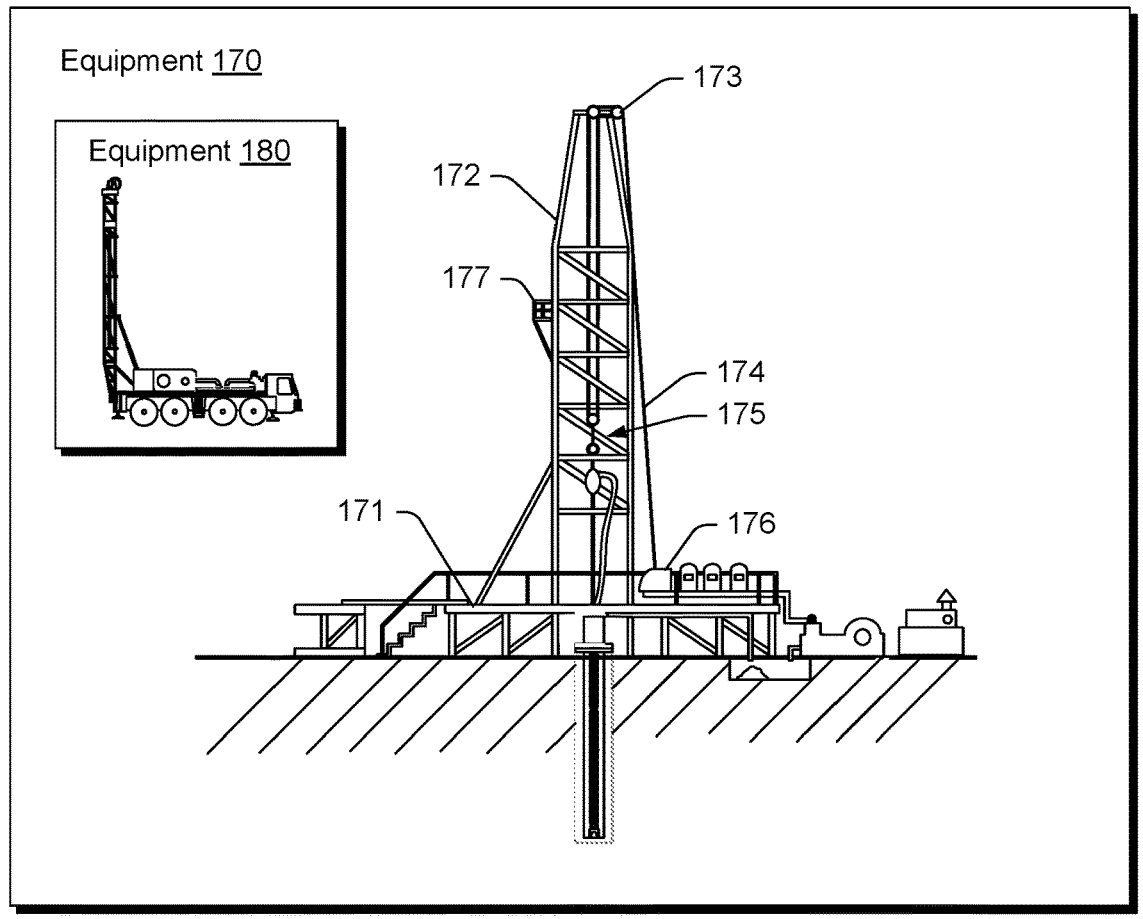

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Well planning is a process by which a path of a well can be mapped, so as to reach a reservoir, for example, to produce fluids therefrom. As an example, constraints can be imposed on a design of a well, for example, a well trajectory may be constrained via one or more physical phenomena that may impact viability of a bore, ease of drilling, etc. Thus, for example, one or more constraints may be imposed based at least in part on known geology of a subterranean domain or, for example, presence of other wells in the area (e.g., collision avoidance). As an example, one or more other constraints may be imposed, for example, consider one or more constraints germane to capabilities of tools being used and/or one or more constraints related to drilling time and risk tolerance.

As an example, a well plan can be generated based at least in part on imposed constraints and known information. As an example, a well plan may be provided to a well owner, approved, and then implemented by a drilling service provider (e.g., a directional driller or "DD").

As an example, a well design system can account for one or more capabilities of a drilling system or drilling systems that may be utilized at a wellsite. As an example, a drilling engineer may be called upon to take such capabilities into account, for example, as one or more of various designs and specifications are created. As an example, a framework may allow for entry of one or more limits where a system can alert a user if one or more of the one or more limits are exceeded.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite. As an example, a well drilling system can include selectable features, which may be enabled or disabled. As an example, where a feature is enabled and amenable to automation, information in a digital well plan can be utilized to determine how one or more automated operations are to be performed.

As an example, a well planning system can include selectable options as to portions of a well plan that allow for execution of the plan to be manual, semi-automated, automated. As an example, a graphical user interface may be rendered to a display where the graphical user interface includes various options such that a well may be planned to account for one or more modes of execution. In such an example, a digital well plan can be generated and utilized in one or more of such modes as to one or more corresponding operations. Such utilization may be automatic or under control of a driller, etc.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
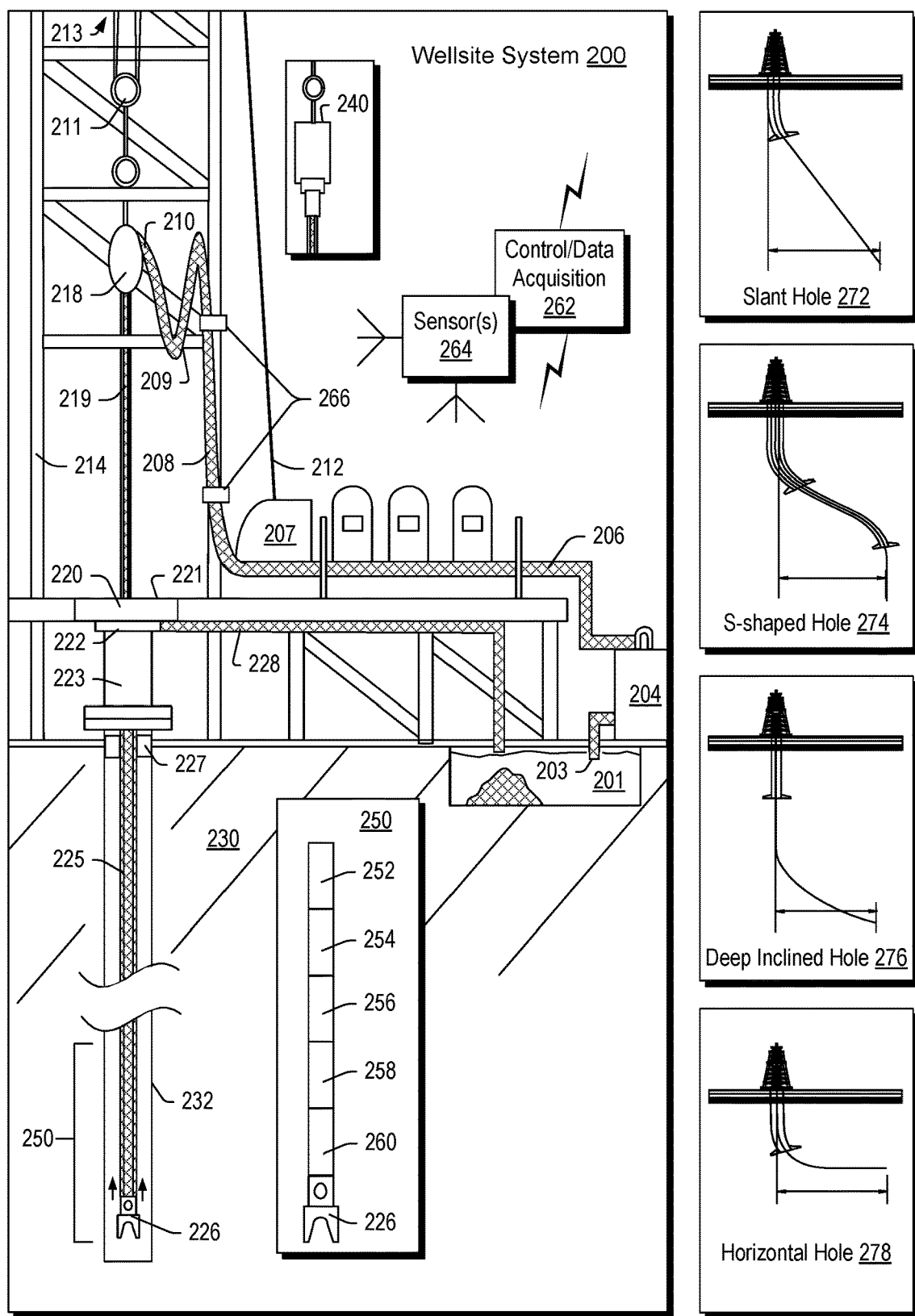
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventers (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
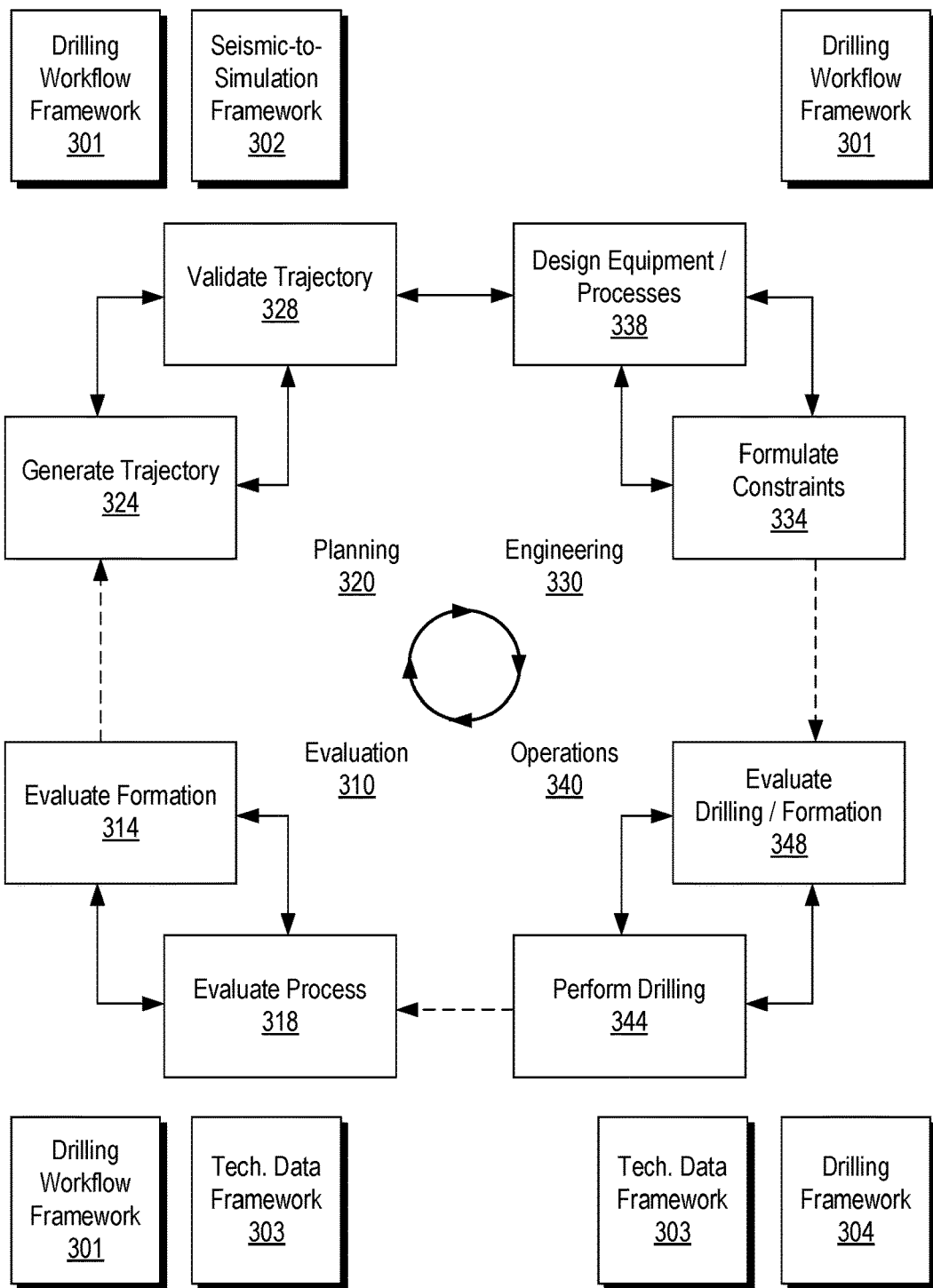
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Tex.) and the technical data framework 303 can be, for example, the TECHLOG® framework (Schlumberger Limited, Houston, Tex.).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. A commercially available example of an object-based framework is the MICROSOFT™ .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Tex.), the INTERSECT® reservoir simulator (Schlumberger Limited, Houston Tex.), etc.

The aforementioned PETREL® framework provides components that allow for optimization of exploration and development operations. The PETREL® framework includes seismic to simulation software components that can output information for use in increasing reservoir performance, for example, by improving asset team productivity.

Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the commercially available framework environment marketed as the OCEAN® framework environment (Schlumberger Limited, Houston, Tex.), which allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the commercially available OCEAN® framework where the model simulation layer can include or operatively link to the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA® framework, marketed by Schlumberger Limited, Houston, Tex.) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 4:
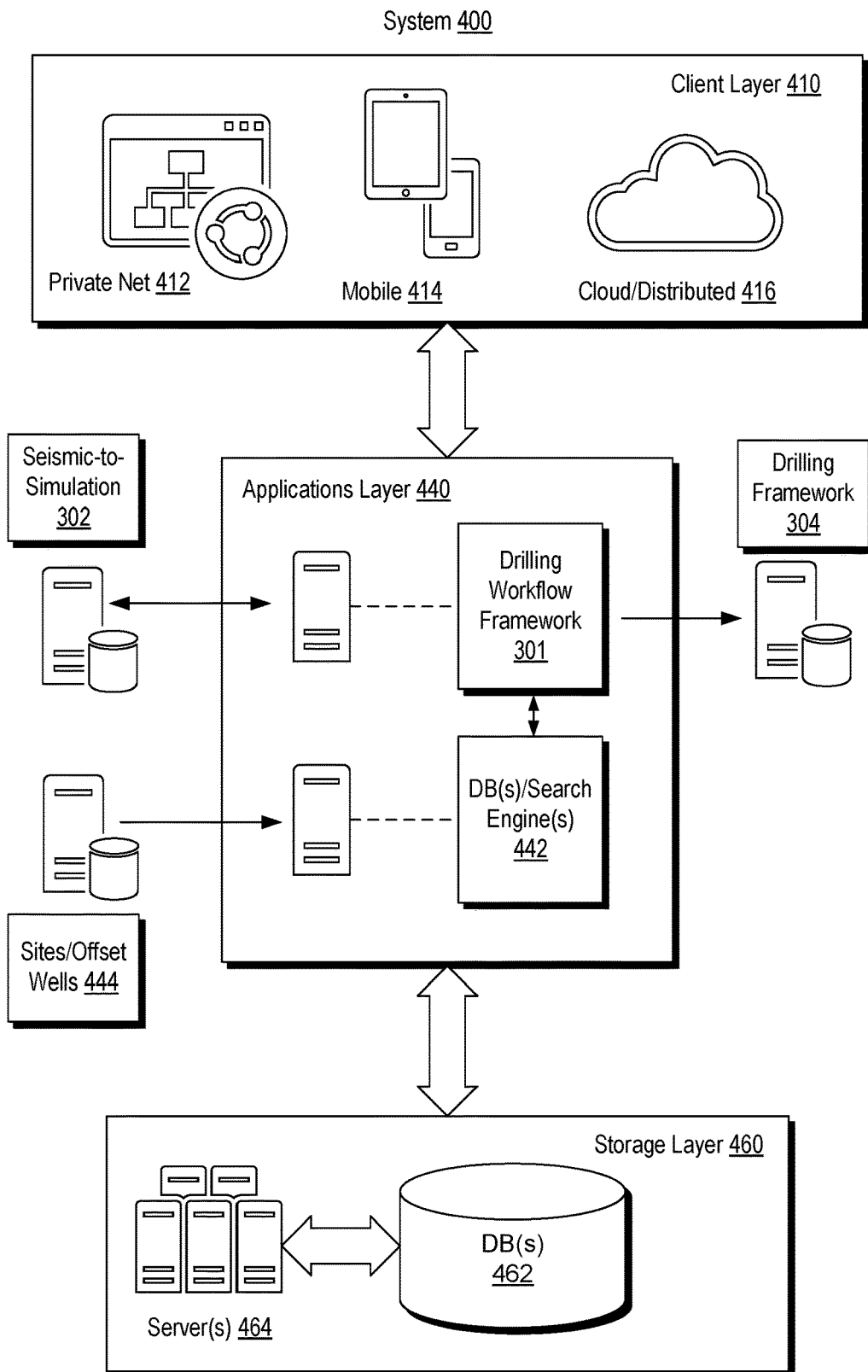
FIG. 4 illustrates an example of a system.

FIG. 4 shows an example of a system 400 that includes a client layer 410, an applications layer 440 and a storage layer 460. As shown the client layer 410 can be in communication with the applications layer 440 and the applications layer 440 can be in communication with the storage layer 460.

The client layer 410 can include features that allow for access and interactions via one or more private networks 412, one or more mobile platforms and/or mobile networks 414 and via the "cloud" 416, which may be considered to include distributed equipment that forms a network such as a network of networks.

In the example of FIG. 4, the applications layer 440 includes the drilling workflow framework 301 as mentioned with respect to the example of FIG. 3. The applications layer 440 also includes a database management component 442 that includes one or more search engines modules.

As an example, the database management component 442 can include one or more search engine modules that provide for searching one or more information that may be stored in one or more data repositories. As an example, the STUDIO E&P™ knowledge environment (Schlumberger Ltd., Houston, Tex.) includes STUDIO FIND™ search functionality, which provides a search engine. The STUDIO FIND™ search functionality also provides for indexing content, for example, to create one or more indexes. As an example, a search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND™ search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 4, the applications layer 440 can include communicating with one or more resources such as, for example, the seismic-to-simulation framework 302, the drilling framework 304 and/or one or more sites, which may be or include one or more offset wellsites. As an example, the applications layer 440 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 4, the storage layer 460 can include various types of data, information, etc., which may be stored in one or more databases 462. As an example, one or more servers 464 may provide for management, access, etc., to data, information, etc., stored in the one or more databases 462. As an example, the module 442 may provide for searching as to data, information, etc., stored in the one or more databases 462.

As an example, the module 442 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 400 of FIG. 4 may be implemented to perform one or more portions of one or more workflows associated with the system 300 of FIG. 3. For example, the drilling workflow framework 301 may interact with the technical data framework 303 and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

As an example, a method can include establishing an Internet of Things (IoT) hub or hubs. As an example, such a hub or hubs can include one or more device registries. In such an example, the hub or hubs may provide for storage of metadata associated with a device and, for example, a per-device authentication model. As an example, where location information indicates that a device (e.g., wellsite equipment, etc.) has been changed with respect to its location, a method can include revoking the device in a hub.

As an example, such an architecture utilized in a system may include features of the AZURE™ architecture (Microsoft Corporation, Redmond, Wash.). As an example, a cloud portal block can include one or more features of an AZURE™ portal that can manage, mediate, etc. access to one or more services, data, connections, networks, devices, etc.

As an example, a system can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 5:
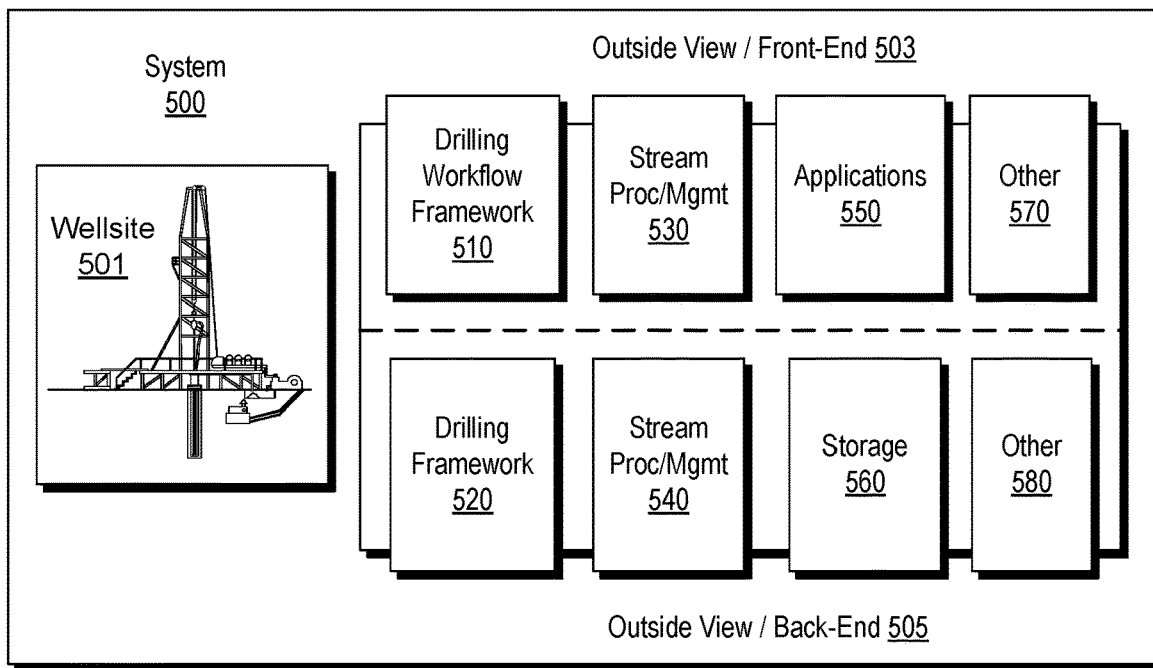
FIG. 5 illustrates an example of a system and an example of a scenario.
Figure 5:
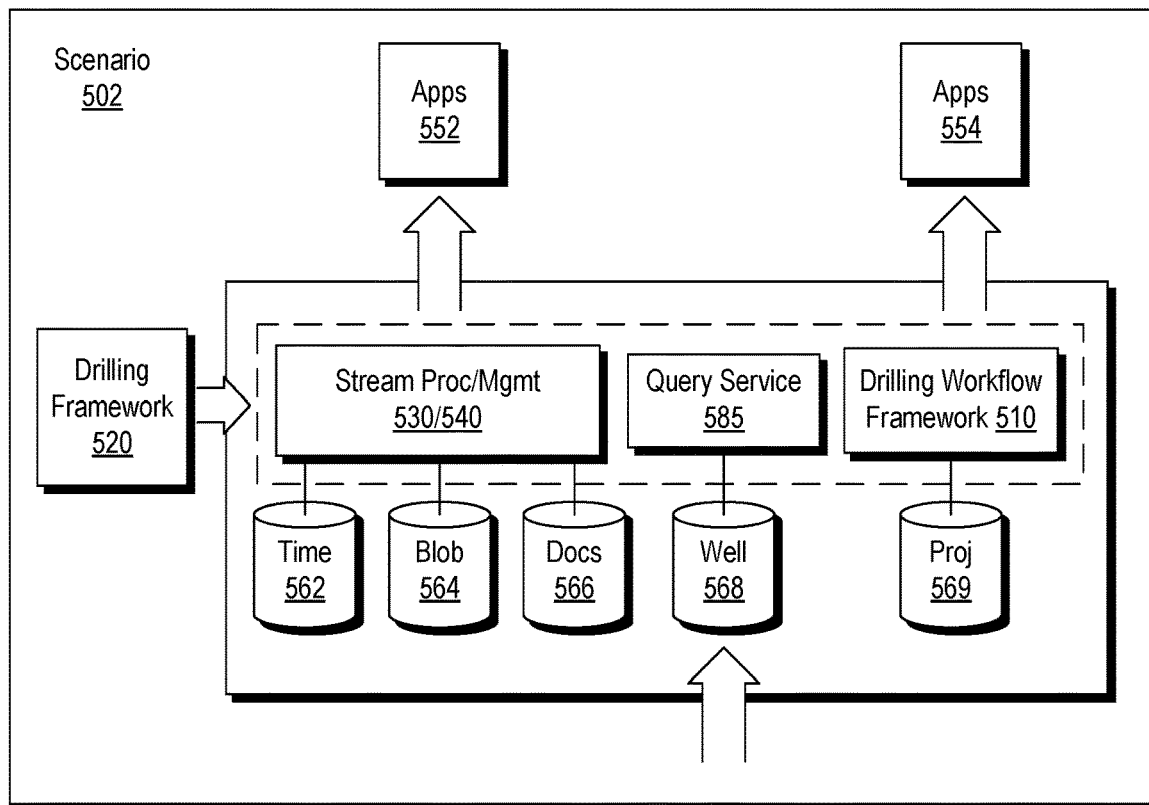

FIG. 5 shows an example of a system 500 associated with an example of a wellsite system 501 and also shows an example scenario 502. As shown in FIG. 5, the system 500 can include a front-end 503 and a back-end 505 from an outside or external perspective (e.g., external to the wellsite system 501, etc.). In the example of FIG. 5, the system 500 includes a drilling framework 520, a stream processing and/or management block 540, storage 560 and optionally one or more other features that can be defined as being back-end features. In the example of FIG. 5, the system 500 includes a drilling workflow framework 510, a stream processing and/or management block 530, applications 550 and optionally one or more other features that can be defined as being front-end features.

As an example, a user operating a user device can interact with the front-end 503 where the front-end 503 can interact with one or more features of the back-end 505. As an example, such interactions may be implemented via one or more networks, which may be associated with a cloud platform (e.g., cloud resources, etc.).

As to the example scenario 502, the drilling framework 520 can provide information associated with, for example, the wellsite system 501. As shown, the stream blocks 530 and 540, a query service 585 and the drilling workflow framework 510 may receive information and direct such information to storage, which may include a time series database 562, a blob storage database 564, a document database 566, a well information database 568, a project(s) database 569, etc. As an example, the well information database 568 may receive and store information such as, for example, customer information (e.g., from entities that may be owners of rights at a wellsite, service providers at a wellsite, etc.). As an example, the project database 569 can include information from a plurality of projects where a project may be, for example, a wellsite project.

As an example, the system 500 can be operable for a plurality of wellsites, which may include active and/or inactive wellsites and/or, for example, one or more planned wellsites. As an example, the system 500 can include various components of the system 300 of FIG. 3. As an example, the system 500 can include various components of the system 400 of FIG. 4. For example, the drilling workflow framework 510 can be a drilling workflow framework such as the drilling workflow framework 301 and/or, for example, the drilling framework 520 can be a drilling framework such as the drilling framework 304.

Figure 6:
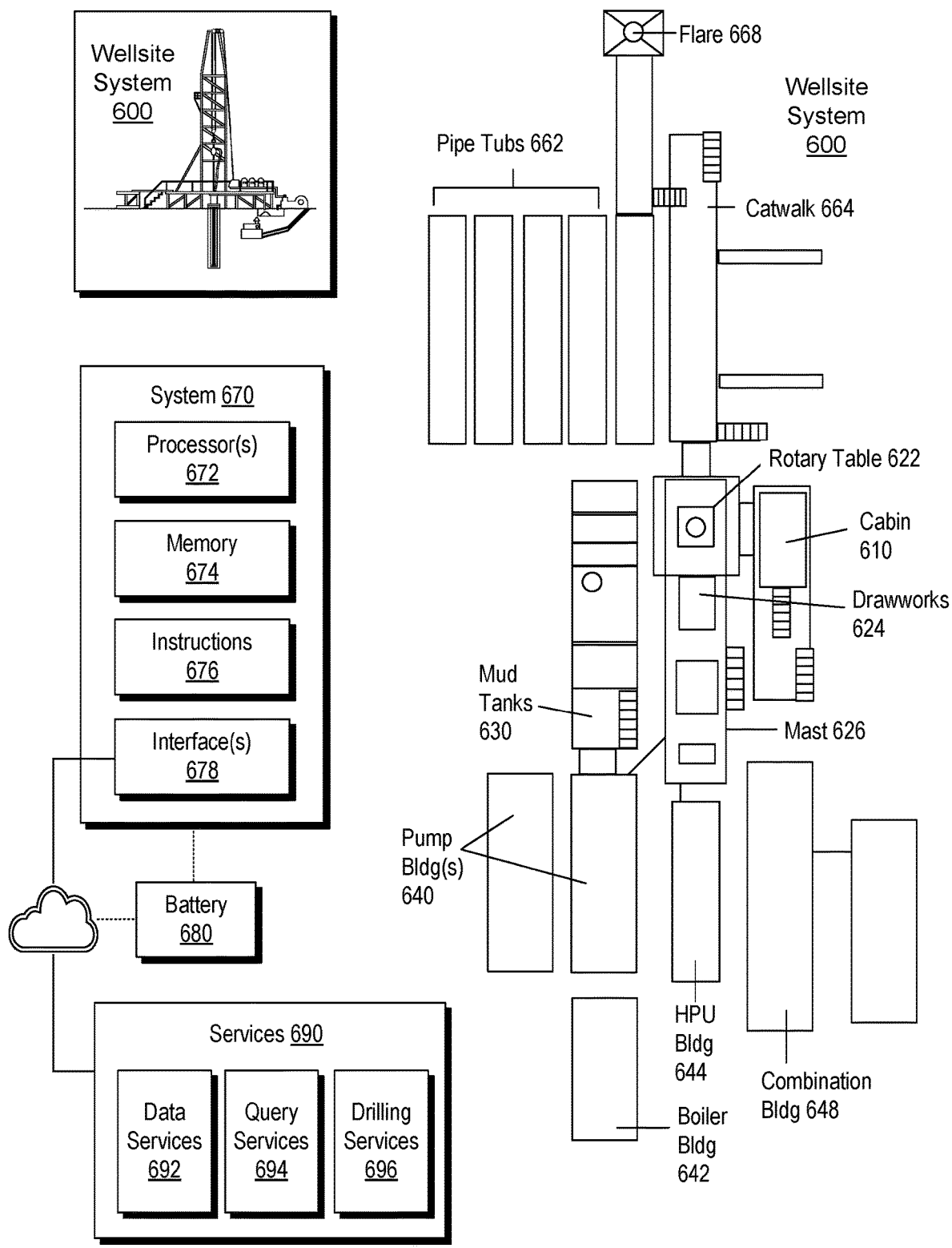
FIG. 6 illustrates an example of a wellsite system.

FIG. 6 shows an example of a wellsite system 600, specifically, FIG. 6 shows the wellsite system 600 in an approximate side view and an approximate plan view along with a block diagram of a system 670 (e.g., a computing system, etc.).

In the example of FIG. 6, the wellsite system 600 can include a cabin 610, a rotary table 622, drawworks 624, a mast 626 (e.g., optionally carrying a top drive, etc.), mud tanks 630 (e.g., with one or more pumps, one or more shakers, etc.), one or more pump buildings 640, a boiler building 642, an HPU building 644 (e.g., with a rig fuel tank, etc.), a combination building 648 (e.g., with one or more generators, etc.), pipe tubs 662, a catwalk 664, a flare 668, etc. Such equipment can include one or more associated functions and/or one or more associated operational risks, which may be risks as to time, resources, and/or humans.

As shown in the example of FIG. 6, the wellsite system 600 can include a system 670 that includes one or more processors 672, memory 674 operatively coupled to at least one of the one or more processors 672, instructions 676 that can be, for example, stored in the memory 674, and one or more interfaces 678. As an example, the system 670 can include one or more processor-readable media that include processor-executable instructions executable by at least one of the one or more processors 672 to cause the system 670 to control one or more aspects of the wellsite system 600. In such an example, the memory 674 can be or include the one or more processor-readable media where the processor-executable instructions can be or include instructions. As an example, a processor-readable medium can be a computer-readable storage medium that is not a signal and that is not a carrier wave.

FIG. 6 also shows a battery 680 that may be operatively coupled to the system 670, for example, to power the system 670. As an example, the battery 680 may be a back-up battery that operates when another power supply is unavailable for powering the system 670. As an example, the battery 680 may be operatively coupled to a network, which may be a cloud network. As an example, the battery 680 can include smart battery circuitry and may be operatively coupled to one or more pieces of equipment via a SMBus or other type of bus.

In the example of FIG. 6, services 690 are shown as being available, for example, via a cloud platform. Such services can include data services 692, query services 694 and drilling services 696. As an example, the services 690 may be part of a system such as the system 300 of FIG. 3, the system 400 of FIG. 4 and/or the system 500 of FIG. 5.

As an example, one or more systems can be utilized to implement a workflow that can be performed collaboratively. As an example, the system 300 of FIG. 3 can be operated as a distributed, collaborative well-planning system. The system 300 can utilize one or more servers, one or more client devices, etc. and may maintain one or more databases, data files, etc., which may be accessed and modified by one or more client devices, for example, using a web browser, remote terminal, etc. As an example, a client device may modify a database or data files on-the-fly, and/or may include "sandboxes" that may permit one or more client devices to modify at least a portion of a database or data files optionally off-line, for example, without affecting a database or data files seen by one or more other client devices. As an example, a client device that includes a sandbox may modify a database or data file after completing an activity in the sandbox.

In some examples, client devices and/or servers may be remote with respect to one another and/or may individually include two or more remote processing units. As an example, two systems can be "remote" with respect to one another if they are not physically proximate to one another; for example, two devices that are located at different sides of a room, in different rooms, in different buildings, in different cities, countries, etc. may be considered "remote" depending on the context. In some embodiments, two or more client devices may be proximate to one another, and/or one or more client devices and a server may be proximate to one another.

As an example, various aspects of a workflow may be completed automatically, may be partially automated, or may be completed manually, as by a human user interfacing with a software application. As an example, a workflow may be cyclic, and may include, as an example, four stages such as, for example, an evaluation stage (see, e.g., the evaluation equipment 310), a planning stage (see, e.g., the planning equipment 320), an engineering stage (see, e.g., the engineering equipment 330) and an execution stage (see, e.g., the operations equipment 340). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 314). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 324), which may involve execution of one or more G&G software packages. Examples of such software packages include the PETREL® framework. As an example, a G&G service provider may determine a well trajectory or a section thereof, based on, for example, one or more model(s) provided by a formation evaluation (e.g., per the evaluation block 314), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom hole assembly (BHA) design, fluid design, and/or the like, to implement a well trajectory (see, e.g., the design block 338). In some embodiments, a second engineering service provider may perform such design using one of more software applications. Such designs may be stored in one or more databases maintained by one or more servers, which may, for example, employ STUDIO® framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 334). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 318). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

As an example, an evaluator may be part of a system that can be implemented for evaluating a design or designs (e.g., in a collaborative workspace after one or more additions, modifications, deletions, etc. are made to a well plan). Changes to a well plan can result in one or more parameters for one or more other designs being changed, which may result in the one or more other designs being outside of one or more design parameter specifications. As an example, an evaluator may manage or resolve such discrepancies or "collisions" between designs posted to a collaborative workspace by different designers (e.g., via individual workspaces, etc.). As an example, a hierarchy may be established for individual design elements, e.g., based on role, expertise, credentials, qualifications, employee experience, etc. For example, an evaluator may then consider a collision and select a design submitted by a designer with a higher status in the hierarchy for that design activity.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a method can include creating a well plan based at least in part on constraints. A subset of these constraints may be provided to one or more individual service providers as part of a well engineering process. In such an example, a service provider responsible for design of a bottom hole assembly (BHA) may receive constraints relevant thereto, while a service provider responsible for a fluid flow plan (e.g., fluid density, composition, etc.) may be provided with a different set of constraints. As an example, results of one service provider may affect decisions, results, etc. of another service provider. For example, consider a bottom hole assembly subsystem design of a wellsite system and a fluid or hydraulics subsystem design of the wellsite system where a selected bottom hole assembly may introduce constraints on the fluid subsystem, or vice versa. Such subsystems may impact one or more other subsystems of a well plan.

As an example, at least some activities in a well planning workflow may be consecutively performed where one activity can act as a gatekeeper or threshold for conducting another activity. As an example, dependencies of constraints among activities may act to complicate a workflow, for example, a fluid plan may be selected after a bottom hole assembly, but may result in changes to the bottom hole assembly. As an example, it may be suboptimal for a bottom hole assembly to be constrained by a fluid flow plan selection, or vice versa, despite one being chosen before the other. Synchronous workflows can result in waste in various approaches to a well planning process.

As an example, a system can allow for a reduction in waste, for example, as may be defined according to LEAN. In the context of LEAN, consider one or more of the following types of waste: Transport (e.g., moving items unnecessarily, whether physical or data); Inventory (e.g., components, whether physical or informational, as work in process, and finished product not being processed); Motion (e.g., people or equipment moving or walking unnecessarily to perform desired processing); Waiting (e.g., waiting for information, interruptions of production during shift change, etc.); Overproduction (e.g., production of material, information, equipment, etc. ahead of demand); Over Processing (e.g., resulting from poor tool or product design creating activity); and Defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or areal networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. As an example, a well plan can be a portion of a well plan, cover one or more subsystems of a wellsite system, be a complete well plan, etc. As an example, a project may be or include a PETREL® framework project where, for example, various portions of a well plan may include objects as defined by properties, etc., in the PETREL® framework.

Figure 7:
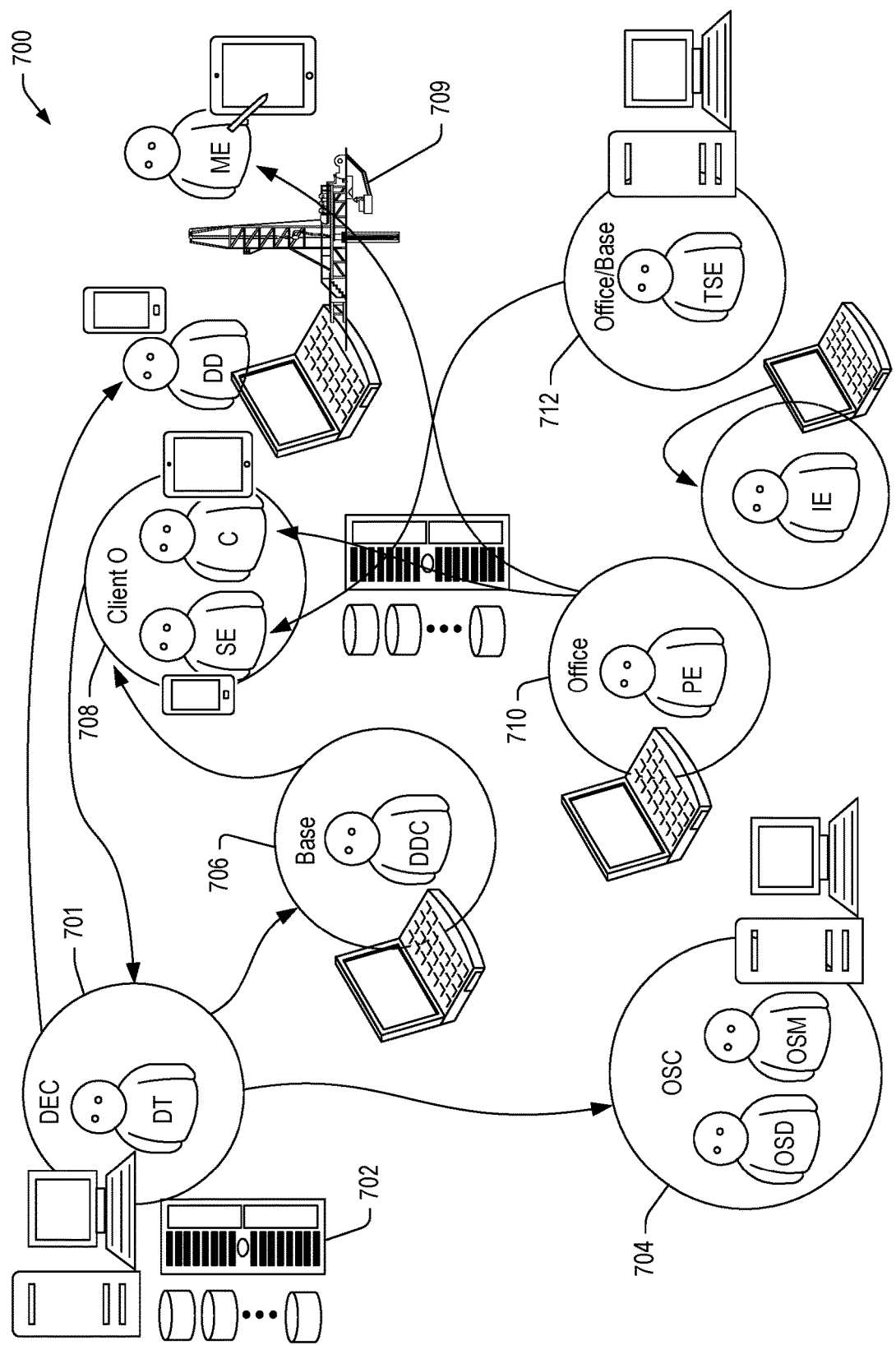
FIG. 7 illustrates an example of an environment.

FIG. 7 shows a schematic view of an example of an environment 700 in which a system that includes one or more features of a system such as the system 300 of FIG. 3, the system 400 of FIG. 4, and/or the system 500 of FIG. 5 may be implemented.

As shown in the example of FIG. 7, the environment 700 may include a Drilling Engineering Center (DEC) 701 as defined at least in part by one or more servers 702 operatively coupled to one or more networks and one or more data storage devices. As shown, the DEC 701 may communicate with an Operations Support Center (OSC) 704, which may include an Operation Support Drilling (OSD) and/or Operations Support Measurements (OSM). As shown in the example of FIG. 7, the OSC 704 can be defined at least in part by one or more computing devices that are operatively coupled to one or more networks for communications with at least the DEC 701.

As to the DEC 701, the one or more servers 702 may be implemented in a distributed computing system. For example, the one or more severs 702 can include one or more cloud-based servers. As an example, the environment 700 can include an architecture that may include features of the AZURE™ architecture (Microsoft Corporation, Redmond, Wash.) where such features can manage, mediate, etc. access to one or more services, data, connections, networks, devices, etc. As an example, the one or more servers 702 can include one or more servers 702 that are operatively coupled to one or more private networks, which may be or include ground-based and/or sky-based equipment.

As shown in the example of FIG. 7, the DEC 701 may be in communication with a base 706 via one or more networks. As shown the base 706 can include a Directional Drilling Coordinator (DDC) and can be defined at least in part by one or more computing devices that are operatively coupled to one or more networks for communications with at least the DEC 701.

As an example, the base 706 and/or the DEC 701 may communicate with a Client Office 708 (Client O), which may include entities such as a Sales Engineer (SE) and/or a customer (C) that can be defined at least in part by one or more computing devices that are operatively coupled to one or more networks for communications with at least the DEC 701.

As an example, the DEC 701 may be in communication with a directional driller (DD) at a wellsite 709 that can be defined at least in part by one or more computing devices that are operatively coupled to one or more networks for communications with at least the DEC 701. As an example, the wellsite 709 can include a drilling framework such as, for example, the drilling framework 304 of FIGS. 3 and 4 and/or the drilling framework 520 of FIG. 5. As an example, the wellsite 709 can include wellsite equipment that includes a computing system such as, for example, the computing system 670 of FIG. 6. As an example, the DEC 701 may host one or more services such as, for example, one or more of the services 690 of FIG. 6. The directional driller (DD) may be defined at least in part by a computing system such as, for example, the computing system 670 of FIG. 6, which may be at least in part in a wellsite command center in a structure such as, for example, the cabin 610 of FIG. 6.

As an example, the environment 700 may include an Office 710 that can be defined at least in part by one or more computing devices that are operatively coupled to one or more networks for communications with at least the DEC 701. As shown in the example of FIG. 7, a Product Engineer (PE) can be defined at least in part by one or more computing devices (e.g., one or more of the computing devices of the Office 710). The Office 710 may communicate with the Client Office 708 and/or a Mud Engineer (ME) at the wellsite 709 where the ME can be defined at least in part by one or more computing devices.

As an example, the ME can be a computing device operated by an individual with skills sufficient to handle various tasks at the wellsite 709 related to hydraulics, which may be defined as a subsystem of the wellsite 709. As an example, the individual can be in possession of a mobile computing device that may be operatively coupled to a computing system such as, for example, the computing system 670 of FIG. 6. In such a manner, the individual can perform tasks related to hydraulics (see, e.g., the mud tanks 630, the pump building(s) 640, the mud-related equipment of the wellsite system 200, etc.) while receiving and/or transmitting information via the mobile computing device (e.g., a smart phone, a tablet, etc.).

As an example, the Office 710 may communicate with an Office/Base 712, which may include a Technical Sales Engineer (TSE), as well as an Interpretation Engineer (IE). As with various other roles, abbreviated via letters, etc., these may correspond to people and/or computing devices. For example, the TSE can be an individual that can utilize a computing device that includes one or more network interfaces that can operatively couple the computing device to one or more networks.

As an example, various types of communications in the environment may involve use of one or more types of communication protocols. For example, consider one or more of the SKYPE® types of protocols (Microsoft Corporation, Redmond, Wash.). As an example, the SKYPE® for Business (e.g., also marketed as "Office Communicator", Microsoft LYNC®, etc.) provides a framework for instant messaging clients in a client-server architecture that can be used, for example, with SKYPE® for Business Server or LYNC® Online as may be available with Microsoft OFFICE 365®.

As an example, in the environment 700 communication may be tracked and managed by a framework implemented using one or more servers in, for example, a client-server architecture, for example, to facilitate collaboration and "manage" one or more workflows that can include synchronous and/or asynchronous activities. As an example, a workflow associated with planning of well, execution of activities at a wellsite, etc. can be at least in part asynchronous where an environment such as, for example, the environment 700 can provide for collaboration between individuals (e.g., and/or machines).

Figure 8:
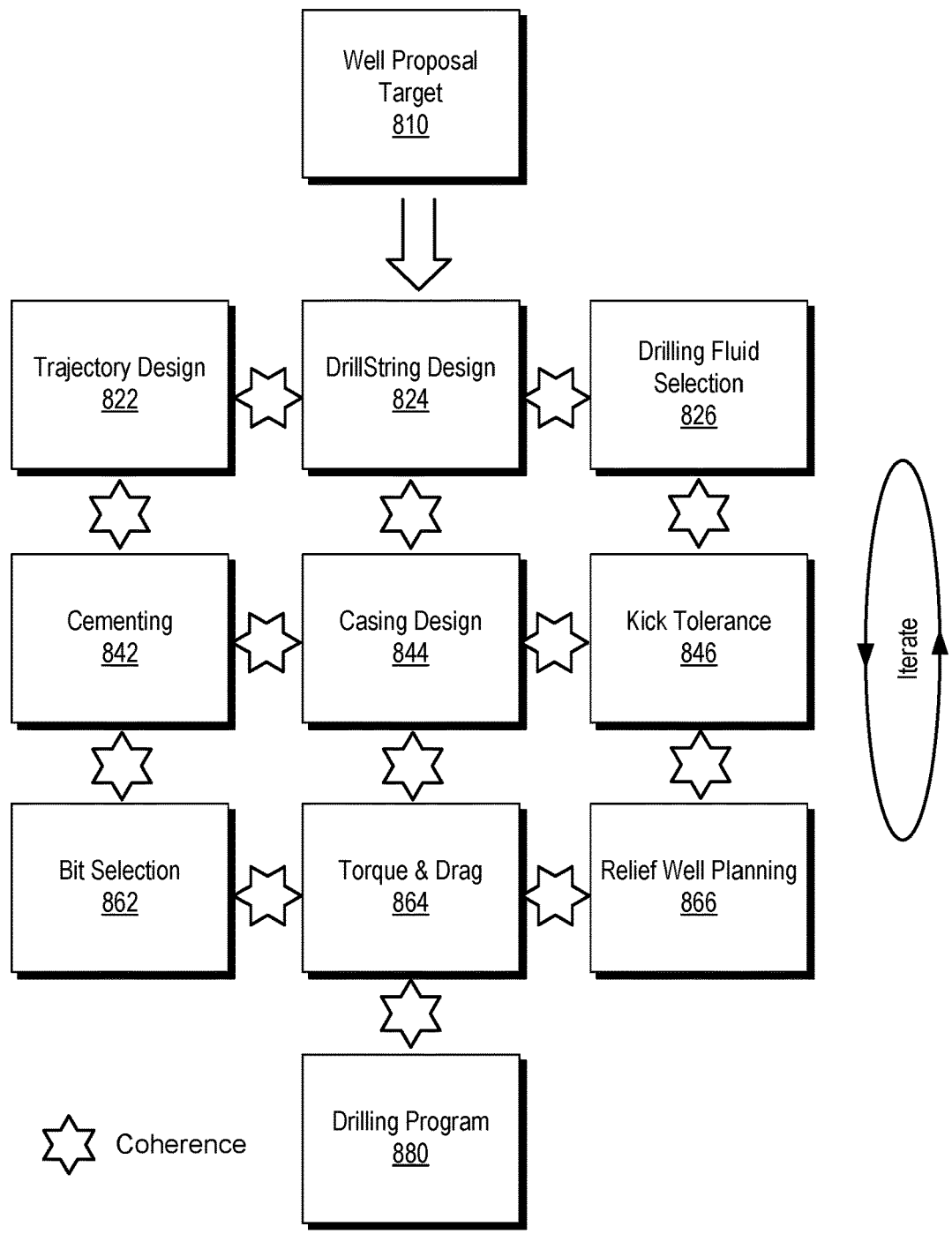
FIG. 8 illustrates an example of a workflow.

FIG. 8 shows an example of a flowchart of a workflow 800 for executing an asynchronous well engineering system. Rather than being consecutive, step-by-step processes, embodiments of the workflow may provide for asynchronous handling of distributed well engineering products among a variety of entities.

In the example of FIG. 8, the workflow 800 may begin by receiving a well proposal target 810. The well proposal target 810 may identify a location of a reservoir, or other object of interest, to which a well may be drilled (e.g., a target). The well proposal target 810 may also indicate a variety of basis-of-design (BOD) data points, and may be stored, for example, on equipment such as, for example, one or more servers in the environment 700 of FIG. 7.

As an example, data from the well proposal target 810, having been fed to a server, may then be accessible to a variety of different types of service providers, whether as a single entity or provided by multiple entities. The various service providers may then undertake various assigned tasks, simultaneously, synchronously, asynchronously, or in one or more other suitable manners. For example, various activities may include trajectory design 822, drill string design 824, drilling fluid selection 826, cementing 842, casing design 844, kick tolerance 846, bit selection 862, torque and drag 864, and relief well planning 866. As an example, such activities may be or correspond to subsystems of a wellsite system. For example, consider various features of the wellsite system 200 of FIG. 2, the wellsite system 501 of FIG. 5, the wellsite system 600 of FIG. 6, etc., as being associated with a workflow such as the workflow 800 of FIG. 8 and, for example, being utilized to drill a well to a target that is specified as the well proposal target 810.

As an example, the activities (and/or others), being conducted potentially out of order, may result in data being uploaded to a server and integrated into a well plan. The results may then be compared with parameters allowable based on results of one or more other activities and/or consistent with the parameters upon which the one or more other activities were conducted. This may be referred to as establishing "coherence" of the well engineering plan. For example, the trajectory design 822 may be modified by the drill string design 824, or vice versa. Accordingly, when one activity is completed after the other, coherency determinations may avoid out-of-design parameters in a drill string as dictated by the trajectory design 822, and/or vice versa. As such, the coherence determinations may include simulating or otherwise calculating acceptable parameter values based on the results of one or more other activities and/or external inputs, such as offset well parameters, to fill in gaps where information may be missing. As an example, an activity can be a task, which may be a task defined by a well plan. For example, a well plan can include a schedule where tasks may be arranged at least in part according to time. As an example, in a schedule, tasks may be arranged sequentially, in parallel, a combination of in parallel and sequentially, etc.

As an example, where a coherency determination indicates that coherency is lost, remediation measures may be taken to re-establish coherency. Such remediation measures may include automatically adjusting one or more other parameters of a well plan, suggesting parameter adjustments to a relevant service provider, and/or allowing one service provider to adjust the results obtained by another service provider. The process of achieving coherency may be conducted after one, some, or each of the activities are completed, and may be iterative until the various activities converge to a design (e.g., an overall well plan, etc.) that is acceptable across disciplines/activities (see, e.g., the system 300 of FIG. 3, etc.). This may be the well engineering plan selected as the drilling program 880, as shown in the example of FIG. 8.

Figure 9:
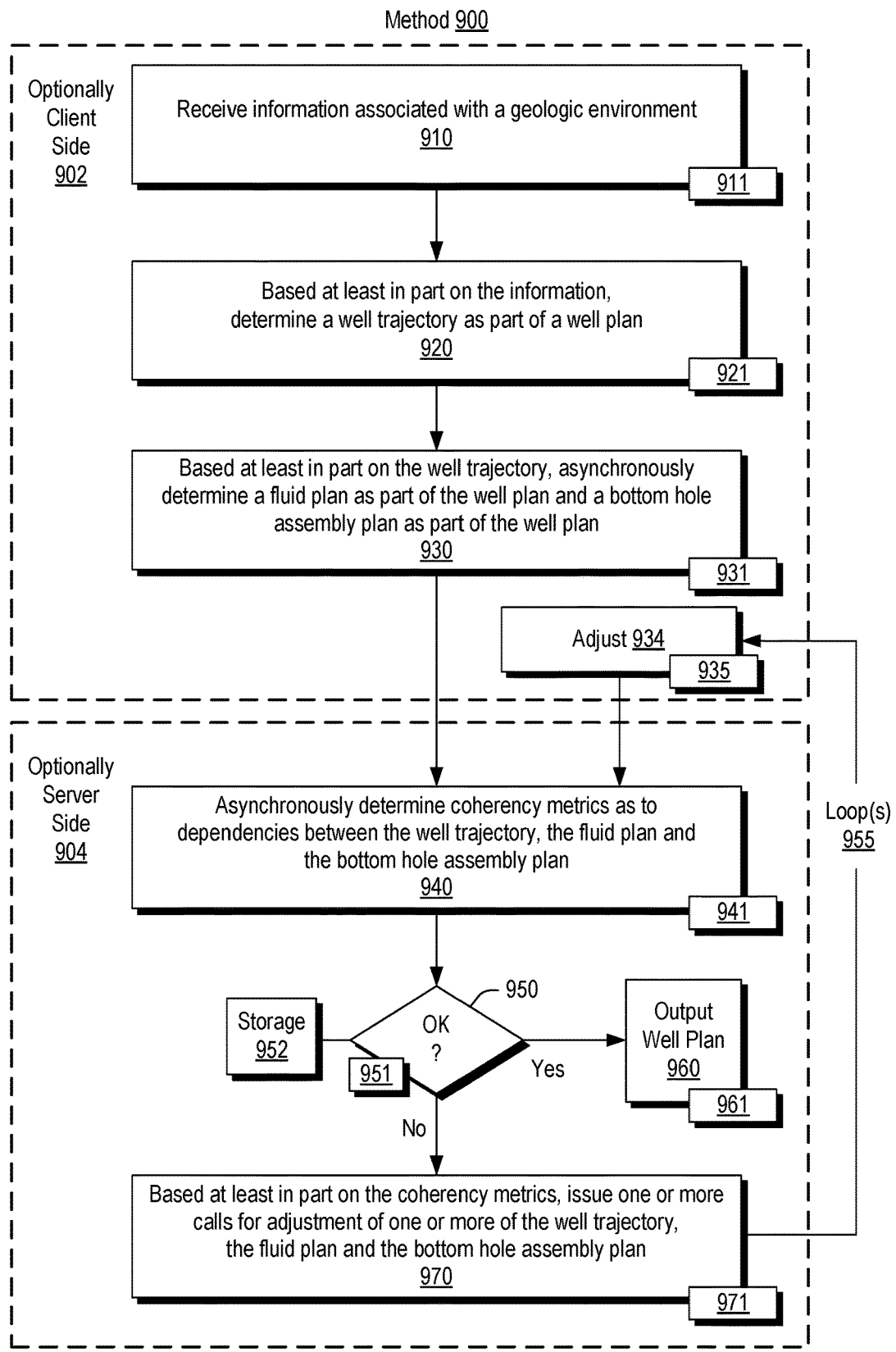
FIG. 9 illustrates an example of a method.

FIG. 9 shows an example of a method 900 that may optionally be implemented in a client side and server side system. As an example, the method 900 may be implemented in an environment such as, for example, the environment 700 of FIG. 7. As an example, a portion of the method 900 may include actions that are client side 902 and a portion of the method 900 may include actions that are server side 904 where a client-server architecture is implemented, optionally using a communications framework that may be suitable for instant messaging. As an example, the method 900 may be implemented where multiple clients communicate at least in part via a server. As an example, the portion indicated as being the server side 904 may be another client, for example, a specialized client that can perform various actions.

As shown in the example of FIG. 9, the method 900 includes a reception block 910 for receiving information associated with a geologic environment; a determination block 920 for determining, based at least in part on the information, a well trajectory as part of a well plan; a determination block 930 for asynchronously determining, based at least in part on the well trajectory, a fluid plan as part of the well plan and a bottom hole assembly (BHA) plan as part of the well plan; a determination block 940 for asynchronously determining coherency metrics as to dependencies between the well trajectory, the fluid plan and the bottom hole assembly (BHA) plan; a decision block 950 for deciding whether coherency exists (e.g., coherency "OK"); an output block 960 for outputting a well plan; and an issuance block 970 for issuing one or more calls for adjustment, based at least in part on the coherency metrics, one or more of the well trajectory, the fluid plan and the bottom hole assembly (BHA) plan. As shown in the example of FIG. 9, the method 900 can continue to an adjustment block 934 for adjusting one or more portions of a well plan which can, in turn, asynchronously (e.g., as appropriate) continue to the determination block 940. As shown in the example of FIG. 9, the method 900 can include one or more loops 955.

As an example, the decision block 950 can be operatively coupled to a storage block 952 such that information as to decisions may be stored and accessed. As an example, the storage block 952 can store information such as a number of iterations, a trend as to coherency for one or more portions of a well plan, etc. As an example, the storage block 952 may include information that can facilitate a decision as to when the method 900 is to progress to the output block 960 to output a well plan. As an example, the storage block 952 may store a data structure that provides a history of adjustments (e.g., issuance of calls for adjustment, etc.). As an example, where calls for adjustments for a portion of a well plan cease, such a condition may indicate that the portion of the well plan is acceptable and/or unlikely to be further subjected to one or more adjustments. For example, a portion of a well plan may be relatively insensitive to one or more other portions, initially and/or after one or more adjustments. For example, a coherency metric may indicate that two portions of a well plan are coherent where the two portions depend on each other and that these two portions may be considered to have been adequately adjusted for purposes of outputting a well plan.

As an example, the method 900 can include a sensitivity analysis block that may be utilized to determine how an adjustment is to be made to a portion of a well plan. For example, where an adjustment to one design parameter of a well trajectory has a considerable impact on one or more design parameters of a bottom hole assembly plan, the issuance block 970 (e.g., or another block or blocks) may act to flag the one design parameter of the well trajectory such that a collaborative session may be commenced to adjust the flagged design parameter. Such an approach can act to diminish swings in a system (e.g., akin to damping swings in an automated controller, etc.).

The method 900 is shown in FIG. 9 in association with various computer-readable media (CRM) blocks 911, 921, 931, 935, 941, 951, 961 and 971. Such blocks generally include instructions suitable for execution by one or more processors (or cores) to instruct a computing device or system to perform one or more actions. While various blocks are shown, a single medium may be configured with instructions to allow for, at least in part, performance of various actions of the method 900. As an example, a computer-readable medium (CRM) may be a computer-readable storage medium that is non-transitory and not a carrier wave. As an example, the blocks 911, 921, 931, 935, 941, 951, 961 and 971 may be provided as one or more modules, for example, such as the one or more modules and/or instructions 1102 of the system 1100 of FIG. 11.

The method 900 of FIG. 9 is illustrated as including various sequential portions and as including various asynchronous portions. As an example, the method 900 can include one or more loops 955 that can correspond to asynchronous actions. For example, where a coherency metric is determined for the fluid plan with respect to the bottom hole assembly (BHA) plan where the fluid plan depends on one or more characteristics of the BHA plan, the decision block 950 can call for an adjustment or adjustments to one or more of the fluid plan and the BHA plan and/or, for example, the well trajectory (e.g., as may be issued by the issuance block 970). As an example, consider the workflow 800 illustrated in FIG. 8 as being a graphical user interface (GUI) where asynchronous events may be highlighted (e.g., via highlighting blocks, connections, etc.), rendering to a display a visualization of a "neural network" where highlights represent "firings" of neural coherency connections (e.g., a map of particular activities of the method 900 of FIG. 9, etc.).

As an example, decisions of the decision block 950 can be made asynchronously where a portion of such decisions may be made on a limited view of an overall well plan. Such an approach may operate on limited information yet in a manner that accounts for dependencies. Such an approach may operate in real-time or near-real time, for example, without waiting for one or more pieces of information to be available. For example, the moment a designer enters a fluid plan (e.g., an initial plan, an adjusted plan, etc.), the determination block 940 may commence determining one or more coherency metrics for the fluid plan with respect to one or more other portions of the well plan that may be available to the determination block 940. While a more "complete" assessment of "coherency" may be available if the determination block 940 would wait for each portion of the well plan to be completed, such an approach could result in a "rate limiting step" (e.g., substantial waiting times for one or more individuals, etc. involved in a workflow such as the workflow 800 of FIG. 8). Where the determination block 940 and the decision block 950 operate within the method 900 asynchronously, for example, upon receipt of the "latest" version of a portion of a well plan, these blocks can trigger one or more adjustments that may be made by an individual and then fed back into the method 900. Such an approach can quickly propagate changes (e.g., adjustments) throughout a collaborative environment, which can reduce downtime, waiting, etc. for various individuals.

As explained with respect to the environment 700 of FIG. 7, distributed computing devices can be utilized to create a well plan. As explained with respect to the workflow 800 of FIG. 8, various actions can depend on one another and coherency of such actions (inter-dependent actions) can be determined. As explained with respect to the method 900 of FIG. 9, it can determine coherency metrics that, for example, correspond to the coherencies of the workflow 800 of FIG. 8 in an environment such as the environment 700 of FIG. 7. The method 900 of FIG. 9 may act to expedite creation of a well plan where assurances exist that at least some portions of the well plan are coherent. Further, the method 900 of FIG. 9 may reduce delays in a workflow implemented at least in part via distributed computing devices where at least some individuals may be operating at a distance from one another (e.g., wellsite versus office). Yet further, the method 900 of FIG. 9 may be implemented at least in part via a communications framework such as, for example, the SKYPE® for Business framework where communications can be logged (e.g., recorded) and reviewed. In such an example, a history of messages, interactions, decisions, etc. may be viewable to various individuals such that they can assess progress of a workflow that intends to output a well plan.

As an example, a graphical user interface (GUI) may be rendered to a display that highlights messaging, for example, using a map of an environment such as the environment 700 of FIG. 7. In such an example, an overview of activities may be visualized where, in time, asynchronous behaviors can be observed. In such an example, a visualization may be color-coded, for example, such that subsystems of a wellsite system are of particular colors, which may optionally be mixed based at least in part on dependencies. For example, where information associated with the drillstring design block 824 is blue and where information associated with the cementing block 842 is yellow, green highlighting in a GUI may indicate dependency (e.g., as to a call for an adjustment, an adjustment, etc.). As an example, intensity of highlighting may correspond to coherency where the less coherency, the greater the intensity. Such an approach may allow for visualization of subsystems, blocks, etc. that may be addressed by one or more individuals. As an example, an entity responsible for one involved subsystem may be rendered with highlighting in an assigned color and an entity responsible for another involved subsystem may be rendered with highlighting in a different, assigned color where a link between the two entities on a map is highlighted with a mixture of the assigned colors.

As an example, the method 900 may be implemented at least in part via a server where various server side actions include issuing one or more messages (e.g., instant messages, instant calls, etc.) via a communication framework such as, for example, the SKYPE® for Business communication framework. As an example, messages may be directed from a server to a client and, for example, from a client to a server. As an example, an instant message can include information about a portion of a well plan where the information is sufficient to determine one or more coherency metrics. For example, the blocks 930 and 934 of the method 900 may involve client to server messaging and the blocks 970 and 934 may involve server to client messaging.

As an example, a method can include one or more of instant messaging, Voice Over IP (VoIP), and video conferencing. As an example, a method can include one or more of providing status as to availability of contacts (e.g., team members, etc.), providing status as to people working on a common portion of a well plan and/or different portions of a well plan, communicating via a common server or group of servers (e.g., as may be secure and where messages can be transmitted over a private network, etc.). As an example, a framework may utilize SIP, TLS and/or SRTP (e.g., to encrypt and secure signaling, media traffic and file sharing, etc.).

Figure 10:
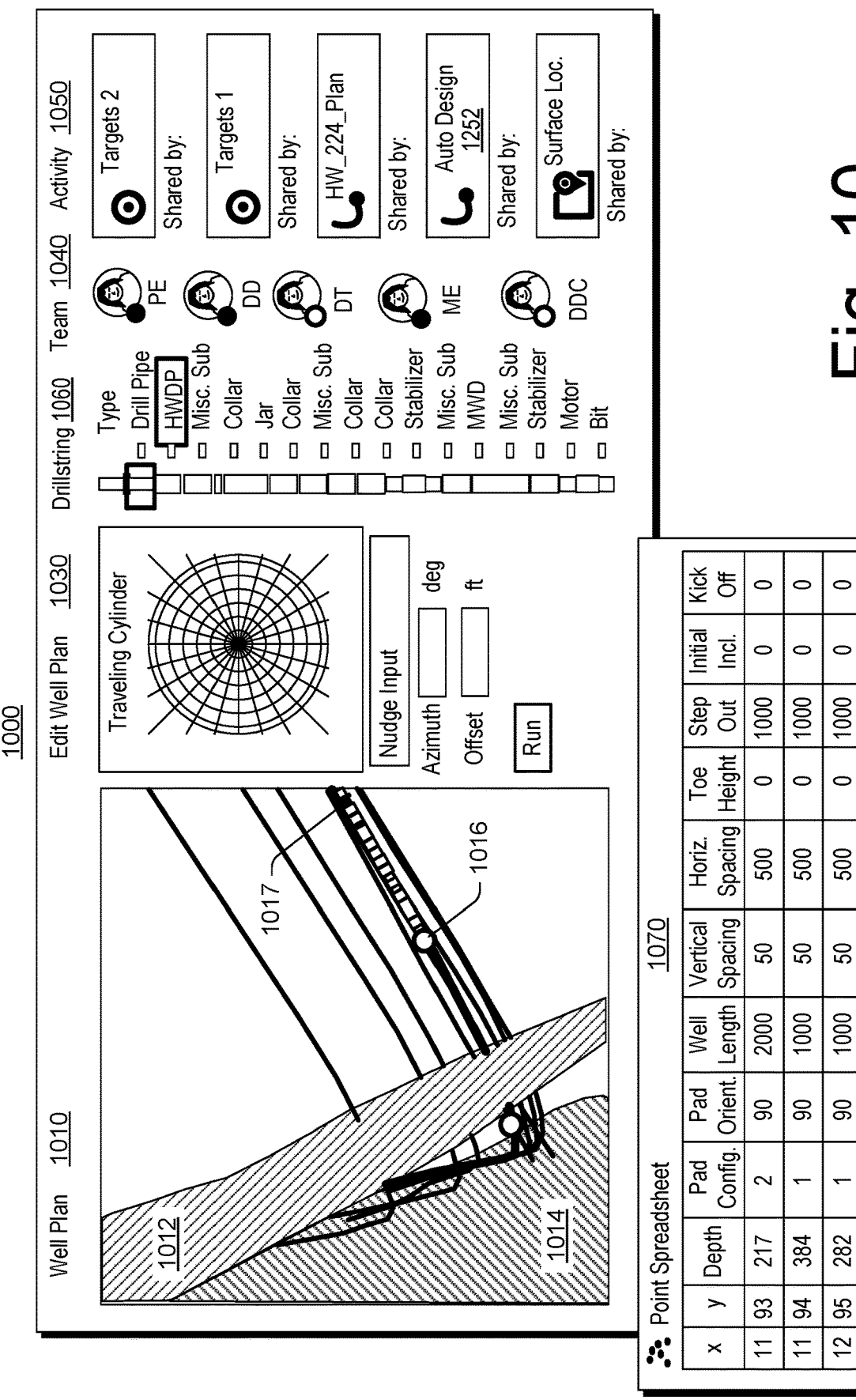
FIG. 10 illustrates an example of a graphical user interface.

FIG. 10 shows an example of a graphical user interface (GUI) 1000 that includes a well plan area 1010, a edit well plan controls 1030, a team area 1040, an activity area 1050, a drillstring area 1060 and an example of a point spreadsheet 1070 that can include points specified in a three-dimensional coordinate system that correspond to points of a well trajectory or well trajectories.

In the example of FIG. 10, the well plan area 1010 shows a rendering of a portion of a well plan in a geologic environment that includes structures 1012 and 1014. A particular well trajectory 1016 includes a rendering thereon (e.g., graphical elements) that correspond to a drillstring 1017, which can correspond to a drillstring represented in the drillstring area 1060 of the GUI 1000.

As shown in the example of FIG. 10, various graphical elements represent individuals (e.g., roles, etc.) that can form at least part of a team as shown in the team area 1040 of the GUI 1000. For example, the team members can have roles such as those explained with respect to the environment 700 of FIG. 7. As an example, a status indicator can be rendered in the team area 1040 to indicate whether a particular individual is available (e.g., online), occupied, unavailable, etc.

As an example, the GUI 1000 may include a status indicator as to coherency. For example, the GUI 1000 may be a main GUI for an individual responsible for a well trajectory as a subsystem of a wellsite system (see, e.g., the trajectory design block 822 of the workflow 800 of FIG. 8). As an example, one or more of the components of a drillstring as rendered in the drillstring area 1060 and in the well plan area 1012 may be deemed to be incoherent with respect to a bend in the well trajectory. In such an example, the GUI 1000 may automatically render a representation of the drillstring as part of a bottom hole assembly (BHA) design to one or more portions of the GUI 1000 to trigger one or more adjustments to be made by the well trajectory "designer". For example, the drillstring 1017 may correspond to the drillstring design where the well trajectory designer can move the graphical elements along the trajectory 1016 where, for example, one or more portions of the well trajectory may be edited (e.g., adjusted). For example, consider an edit via the edit well plan area 1030 (e.g., traveling circle edit, nudge edit, azimuth edit, offset edit, etc.) and/or an edit via the point spreadsheet 1070. In such an example, information may be received by a computing device (e.g., server, etc.) upon such editing to determine one or more coherency metrics as to the well trajectory design and the BHA design (see, e.g., the blocks 822 and 824 of FIG. 8 and the coherence indicator therebetween).

As an example, via a GUI such as the GUI 1000, an individual such as the directional driller (DD) may be online and available for answering one or more questions to assist with the well trajectory design and/or the BHA design. In such an example, the well trajectory designer can access various resources to help to ensure that an adjustment to the well trajectory as triggered by a coherency engine can effectively progress an asynchronous workflow to output of an acceptable well plan.

As an example, a communication framework can provide for communication of information such as one or more design parameters of a subsystem of a well plan and can provide for communication of information such as a messaging session between two or more individuals. Such a communication framework may be an "instant" communication framework such that information is communicated in real-time (e.g., near real-time). The combination of such types of communication via a common communication framework can allow for a more close identification of roles and individuals. Such an approach can allow for a complex workflow to be performed in an asynchronous manner, which can reduce waste while driving the workflow to output of an acceptable well plan.

As an example, an environment may be suitable for use during execution of at least a portion of a well plan. For example, the computing system 670 of FIG. 6 may be part of an environment such as the environment 700 of FIG. 7. As an example, information acquired during drilling may be fed into a method such as the method 900 of FIG. 9 where a coherency determination may be made as to expected results (e.g., expected data) and real results (e.g., real data). In such an example, the method 900 may operate to adjust a yet to be executed portion of a well plan that is at least in part being executed at a wellsite. Such an approach may expedite revision of the yet to be executed portion of the well plan and may, for example, involve collaboration between entities using, for example, a GUI such as the GUI 1000.

As mentioned, a method can include flagging one or more design parameters of one or more portions of a well plan where, for example, the one or more design parameters may cause substantial ripples, cycling, swings, etc. For example, a GUI such as the GUI 1000 of FIG. 10 may be implemented to render a notice for one or more roles, subsystems, etc. as to a particular design sensitivity. In such an example, individuals may access respective GUIs to collaborate in real-time (e.g., near real-time) via messaging, voice, whiteboard, interactive models, etc. to settle on design parameters that are acceptable. In a method such as, for example, the method 900, various design parameters may be settled via one or more iterations and a fewer number of design parameters may be settled via a collaborative session. Again, a method may aim to maintain an asynchronous character of a workflow undertaken by a number of distributed individuals where such individual can be assigned one or more roles (e.g., as to one or more activities such as activities associated with the blocks of the workflow 800 of FIG. 8, etc.). As an example, asynchronous activity may be mapped and rendered to a display for visualization, optionally with color coding. In such an example, asynchronous flashes may be visualized in real-time (e.g., near real-time) which may be indicative of a state of a workflow, a system, etc. (e.g., whether coherency is being achieved by frequency of flashes diminishing, etc.).

As an example, a method for planning a well can include determining a well trajectory; determining a fluid plan, where the fluid plan is at least partially dependent upon the well trajectory and the well trajectory is at least partially dependent upon the fluid plan; determining a bottom hole assembly for a drillstring to form the well, where the bottom hole assembly depends at least partially on the well trajectory and the fluid plan, and where the fluid plan depends at least partially on the bottom hole assembly, and the fluid plan depends at least partially on the bottom hole assembly; and determining a coherency of the well trajectory, the fluid plan, and the bottom hole assembly, where the well trajectory, the fluid plan, and the bottom hole assembly are determined asynchronously.

As an example, a method can include determining a well trajectory by receiving, at a server, a well trajectory from an engineer and can include determining coherency (e.g., one or more coherency metrics) at least in part via determining constraints on the well trajectory based on a fluid plan and a bottom hole assembly, when the fluid plan and the bottom hole assembly have been determined; prescribing estimated constraints on the well trajectory when the fluid plan, the bottom hole assembly, or both have not been determined; and determining whether the well trajectory received from the engineer is within the constraints or the estimated constraints.

As an example, a method can include determining a bottom hole assembly by receiving, at a server, a bottom hole assembly selection from an engineer and can include determining coherency (e.g., one or more coherency metrics) by determining constraints on the bottom hole assembly based on a fluid plan and a well trajectory, when the fluid plan and the well trajectory have been determined; prescribing estimated constraints on the bottom hole assembly when the fluid plan, the well trajectory, or both have not been determined; and determining whether the well trajectory received from the engineer is within the constraints or the estimated constraints.

As an example, a method can include determining a fluid plan by receiving, at a server, a fluid plan from an engineer and can include determining coherency (e.g., one or more coherency metrics) by determining constraints on the fluid plan based on the bottom hole assembly and the well trajectory, when the bottom hole assembly and the well trajectory have been determined; prescribing estimated constraints on the fluid plan when the bottom hole assembly, the well trajectory, or both have not been determined; and determining whether the fluid plan received from the engineer is within the constraints or the estimated constraints.

As an example, a computing system can include one or more processors; and a memory system that includes one or more non-transitory, computer-readable media storing instructions that, when executed by at least one of the one or more processors, cause the computing system to perform operations where the operations can include determining a well trajectory; determining a fluid plan, where the fluid plan is at least partially dependent upon the well trajectory and the well trajectory is at least partially dependent upon the fluid plan; determining a bottom hole assembly for a drill string to form the well, where the bottom hole assembly selected depends at least partially on the well trajectory and the fluid plan, and where the fluid plan depends at least partially on the bottom hole assembly, and the fluid plan depends at least partially on the bottom hole assembly selected; and determining a coherency of the well trajectory, the fluid plan, and the bottom hole assembly, where the well trajectory, the fluid plan, and the bottom hole assembly are determined asynchronously. In such an example, the determining the well trajectory can include receiving, at a server, a well trajectory from an engineer and determining the coherency can include: determining constraints on the well trajectory based on the fluid plan and the bottom hole assembly, when the fluid plan and the bottom hole assembly have been determined; prescribing estimated constraints on the well trajectory when the fluid plan, the bottom hole assembly, or both have not been determined; and determining whether the well trajectory received from the engineer is within the constraints or the estimated constraints.

As an example, in a system, determining a bottom hole assembly can include receiving, at a server, a bottom hole assembly selection from an engineer and determining coherency can include determining constraints on the bottom hole assembly based on the fluid plan and the well trajectory, when the fluid plan and the well trajectory have been determined; prescribing estimated constraints on the bottom hole assembly when the fluid plan, the well trajectory, or both have not been determined; and determining whether the well trajectory received from the engineer is within the constraints or the estimated constraints.

As an example, in a system, determining a fluid plan can include receiving, at a server, a fluid plan from an engineer and determining coherency can include determining constraints on the fluid plan based on the bottom hole assembly and the well trajectory, when the bottom hole assembly and the well trajectory have been determined; prescribing estimated constraints on the fluid plan when the bottom hole assembly, the well trajectory, or both have not been determined; and determining whether the fluid plan received from the engineer is within the constraints or the estimated constraints.

As an example, a non-transitory computer-readable medium storing instructions that, when executed by at least one processor of a computing system, can cause the computing system to perform operations where the operations can include determining a well trajectory; determining a fluid plan, where the fluid plan is at least partially dependent upon the well trajectory and the well trajectory is at least partially dependent upon the fluid plan; determining a bottom hole assembly for a drill string to form the well, where the bottom hole assembly depends at least partially on the well trajectory and the fluid plan, and where the fluid plan depends at least partially on the bottom hole assembly, and the fluid plan depends at least partially on the bottom hole assembly selected; and determining a coherency of the well trajectory, the fluid plan, and the bottom hole assembly, where the well trajectory, the fluid plan, and the bottom hole assembly are determined asynchronously. In such an example, determining a well trajectory can include receiving, at a server, a well trajectory from an engineer and determining coherency can include determining constraints on the well trajectory based on the fluid plan and the bottom hole assembly, when the fluid plan and the bottom hole assembly have been determined; prescribing estimated constraints on the well trajectory when the fluid plan, the bottom hole assembly, or both have not been determined; and determining whether the well trajectory received from the engineer is within the constraints or the estimated constraints.

As an example, a method can include determining a bottom hole assembly by receiving, at a server, a bottom hole assembly selection from an engineer and can include determining coherency via determining constraints on the bottom hole assembly based on a fluid plan and a well trajectory, when the fluid plan and the well trajectory have been determined; prescribing estimated constraints on the bottom hole assembly when the fluid plan, the well trajectory, or both have not been determined; and determining whether the well trajectory received from the engineer is within the constraints or the estimated constraints.

As an example, a method can include determining a fluid plan by receiving, at a server, a fluid plan from an engineer and can include determining coherency by determining constraints on the fluid plan based on a bottom hole assembly and a well trajectory, when the bottom hole assembly and the well trajectory have been determined; prescribing estimated constraints on the fluid plan when the bottom hole assembly, the well trajectory, or both have not been determined; and determining whether the fluid plan received from the engineer is within the constraints or the estimated constraints.

As an example, a method can include asynchronously receiving a well trajectory as part of a well plan, a fluid plan as part of the well plan and a bottom hole assembly plan as part of the well plan where the well trajectory is based at least in part on information associated with a geologic environment; asynchronously determining coherency metrics as to dependencies between the well trajectory, the fluid plan and the bottom hole assembly plan; and, based at least in part on the coherency metrics, issuing one or more messages that call for adjusting one or more of the well trajectory, the fluid plan and the bottom hole assembly plan. In such an example, the method can include repeating the asynchronously determining coherency metrics after receiving one or more of an adjusted well trajectory, an adjusted fluid plan and an adjusted bottom hole assembly plan. In such an example, a method can include rendering information to a display such as, for example, via a graphical user interface (GUI) that highlights various adjustments (e.g., portions of a well plan being adjusted, etc.).

As an example, a method can include receiving a fluid plan by a server operatively coupled to a network where the fluid plan is associated with a first network address; and receiving a bottom hole assembly plan by a server operatively coupled to a network where the bottom hole assembly plan is associated with a second network address where the first network address and the second network address differ. For example, a method can be implemented in a distributed computing environment where different entities may be responsible for different portions of a well plan.

As an example, a method can include issuing one or more messages to a communication framework that can include an instant messaging server that directs instant messages to instant messaging clients. For example, in a distributed computing environment, instant messaging clients may be associated with particular portions of a well plan. In such an example, instant messaging may allow for coordinate action where such action is warranted (e.g., based on a lack of coherency, etc., between portions of a well plan). As an example, a method can include storing one or more messages to a data storage device (e.g., or devices).

As an example, a method can include determining coherency metrics via determining at least one metric that characterizes a bottom hole assembly of a bottom hole assembly plan with respect to its physical compatibility with a well trajectory. In such an example, a coherency metric can indicate that the bottom hole assembly is physically incompatible with a bend of the well trajectory (e.g., a bend characterized by an angle or angles and a BHA characterized by a linear length).

As an example, a method can include determining coherency metrics via determining at least one metric that characterizes drilling fluid of a fluid plan with respect to its physical compatibility with the well trajectory as the well trajectory is being drilled via a bottom hole assembly of a bottom hole assembly plan. In such an example, a coherency metric can indicate that the drilling fluid is physically incompatible with removable of cuttings in at least a portion of the well trajectory as the well trajectory is being drilled via the bottom hole assembly of the bottom hole assembly plan. For example, fluid flow may be insufficient to move cuttings of a particular size or sizes and/or fluid may be of a viscosity that is inadequate to move cuttings of a particular size or sizes. In such an example, geometry of the well trajectory at one or more depths may be considered, for example, with respect to one or more of gravity, type of rock being drilled, temperature, etc.

As an example, a method can include outputting a well plan. As an example, a method can include receiving information acquired at a wellsite during execution of at least a portion of a well plan and, for example, issuing one or more calls for adjustment of one or more portions of the well plan based at least in part on the information.

As an example, a system can include one or more processors; memory operatively coupled to the one or more processors; and processor-executable instructions stored in the memory and executable by at least one of the processors to instruct the system to asynchronously receive a well trajectory as part of a well plan, a fluid plan as part of the well plan and a bottom hole assembly plan as part of the well plan where the well trajectory is based at least in part on information associated with a geologic environment, asynchronously determine coherency metrics as to dependencies between the well trajectory, the fluid plan and the bottom hole assembly plan, and, based at least in part on the coherency metrics, issue one or more messages that call for adjusting one or more of the well trajectory, the fluid plan and the bottom hole assembly plan. In such an example, the system can include a communication framework that issues the one or more messages from the system to one or more network addresses. For example, a communication framework can be an instant messaging communication framework where the one or more network addresses include client network addresses of a client-server architecture.

As an example, a fluid plan can be associated with a first network address and a bottom hole assembly plan can be associated with a second network address where the first network address and the second network address differ.

As an example, a system can include processor-executable instructions stored in memory of the system and executable by at least one processor of the system to instruct the system to receive information acquired at a wellsite during execution of at least a portion of the well plan and to issue one or more calls for adjustment of one or more portions of the well plan based at least in part on the information.

As an example, one or more computer-readable storage media can include computer-executable instructions executable to instruct a computing system to: asynchronously receive a well trajectory as part of a well plan, a fluid plan as part of the well plan and a bottom hole assembly plan as part of the well plan where the well trajectory is based at least in part on information associated with a geologic environment; asynchronously determine coherency metrics as to dependencies between the well trajectory, the fluid plan and the bottom hole assembly plan; and, based at least in part on the coherency metrics, issue one or more messages that call for adjusting one or more of the well trajectory, the fluid plan and the bottom hole assembly plan. In such an example, instructions can be included instruct a computing system to issue the one or more messages from the computing system to one or more network addresses.

As an example, one or more computer-readable storage media can include computer-executable instructions executable to instruct a computing system to issue one or more messages via an instant messaging communication framework.

As an example, one or more computer-readable storage media can include computer-executable instructions executable to instruct a computing system to receive information acquired at a wellsite during execution of at least a portion of a well plan and to issue one or more calls for adjustment of one or more portions of the well plan based at least in part on the information.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 11:
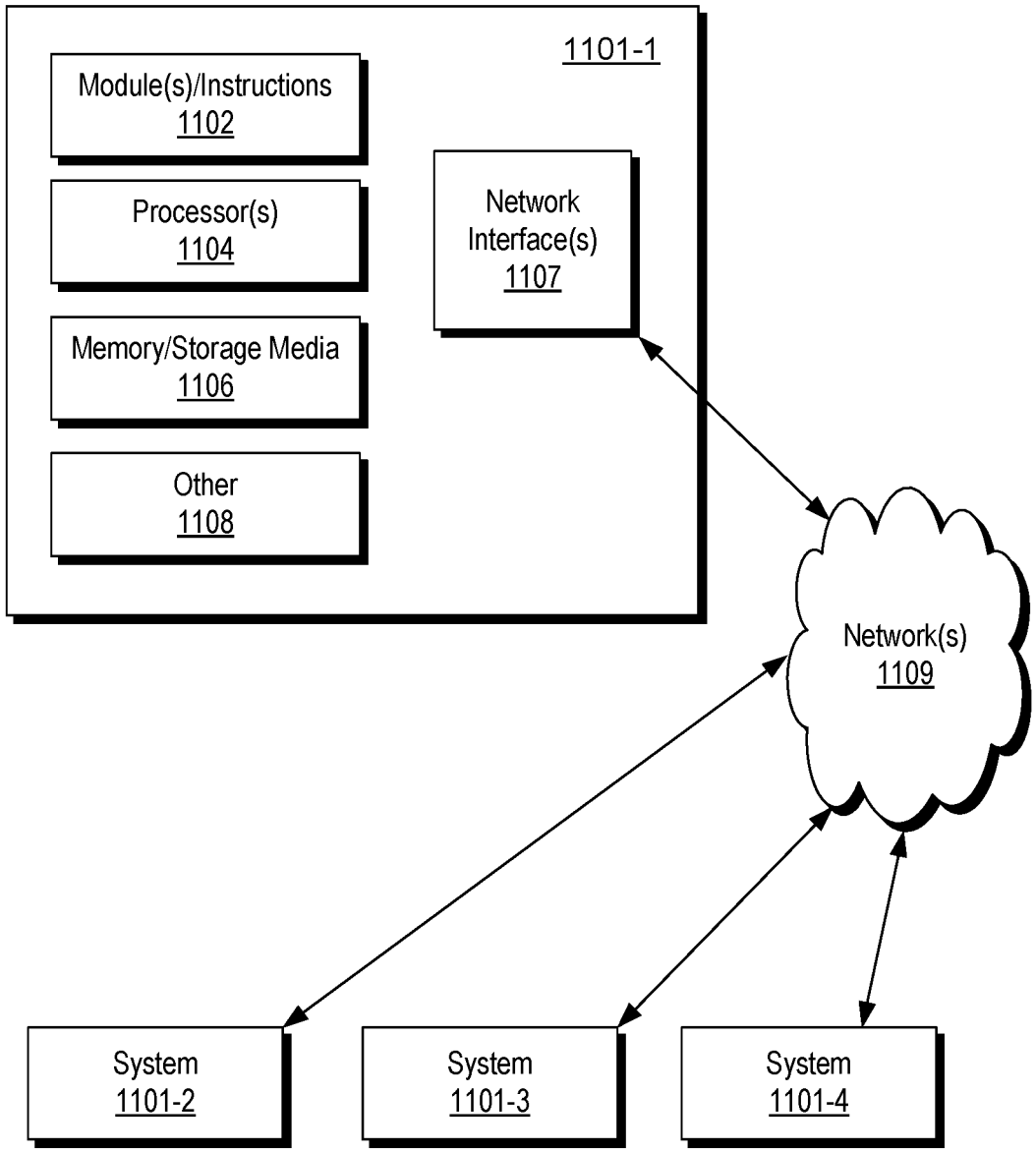
FIG. 11 illustrates examples of computing and networking equipment.

In some embodiments, a method or methods may be executed by a computing system. FIG. 11 shows an example of a system 1100 that can include one or more computing systems 1101-1, 1101-2, 1101-3 and 1101-4, which may be operatively coupled via one or more networks 1109, which may include wired and/or wireless networks.

As an example, a system can include an individual computer system or an arrangement of distributed computer systems. In the example of FIG. 11, the computer system 1101-1 can include one or more modules 1102, which may be or include processor-executable instructions, for example, executable to perform various tasks (e.g., receiving information, requesting information, processing information, simulation, outputting information, etc.).

As an example, a module may be executed independently, or in coordination with, one or more processors 1104, which is (or are) operatively coupled to one or more storage media 1106 (e.g., via wire, wirelessly, etc.). As an example, one or more of the one or more processors 1104 can be operatively coupled to at least one of one or more network interface 1107. In such an example, the computer system 1101-1 can transmit and/or receive information, for example, via the one or more networks 1109 (e.g., consider one or more of the Internet, a private network, a cellular network, a satellite network, etc.).

As an example, the computer system 1101-1 may receive from and/or transmit information to one or more other devices, which may be or include, for example, one or more of the computer systems 1101-2, etc. A device may be located in a physical location that differs from that of the computer system 1101-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1106 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 12:
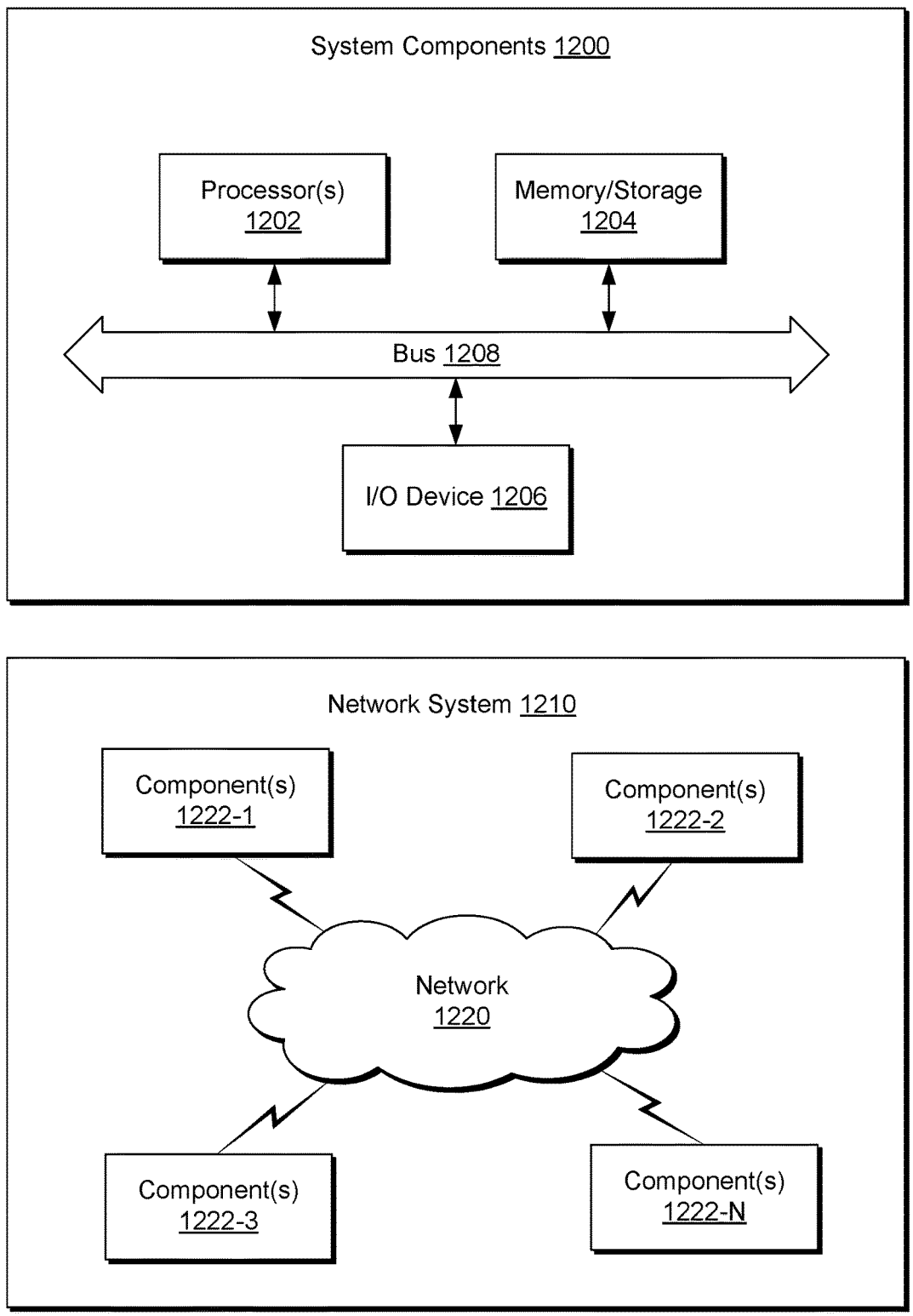
FIG. 12 illustrates example components of a system and a networked system.

FIG. 12 shows components of a computing system 1200 and a networked system 1210. The system 1200 includes one or more processors 1202, memory and/or storage components 1204, one or more input and/or output devices 1206 and a bus 1208. According to an embodiment, instructions may be stored in one or more computer-readable media (e.g., memory/storage components 1204). Such instructions may be read by one or more processors (e.g., the processor(s) 1202) via a communication bus (e.g., the bus 1208), which may be wired or wireless. The one or more processors may execute such instructions to implement (wholly or in part) one or more attributes (e.g., as part of a method). A user may view output from and interact with a process via an I/O device (e.g., the device 1206). According to an embodiment, a computer-readable medium may be a storage component such as a physical memory storage device, for example, a chip, a chip on a package, a memory card, etc.

According to an embodiment, components may be distributed, such as in the network system 1210. The network system 1210 includes components 1222-1, 1222-2, 1222-3, ... 1222-N. For example, the components 1222-1 may include the processor(s) 1202 while the component(s) 1222-3 may include memory accessible by the processor(s) 1202. Further, the component(s) 1202-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
asynchronously receiving, via a computing system operatively coupled to a network, a well trajectory as part of a well plan, a fluid plan as part of the well plan and a bottom hole assembly plan as part of the well plan wherein the well trajectory is based at least in part on information associated with a geologic environment, wherein the fluid plan is associated with a first network address, wherein the bottom hole assembly plan is associated with a second network address, and wherein the first network address and the second network address differ;
asynchronously determining coherency metrics as to dependencies between the well trajectory, the fluid plan and the bottom hole assembly plan;
based at least in part on the coherency metrics indicating a lack of coherency, issuing one or more messages that call for adjusting one or more of the well trajectory, the fluid plan and the bottom hole assembly plan;
repeating the asynchronously determining coherency metrics after receiving one or more of the adjusted well trajectory, the adjusted fluid plan and the adjusted bottom hole assembly plan; and
based at least in part on the coherency metrics of the repeating indicating coherency, outputting the well plan wherein the well plan calls for automation of one or more operations at a wellsite via one or more automation mechanisms of a well drilling system.

2. The method of claim 1 wherein the issuing the one or more messages comprises issuing the one or more messages to a communication framework that comprises an instant messaging server that directs instant messages to instant messaging clients.

3. The method of claim 1 wherein the determining coherency metrics comprises determining at least one metric that characterizes a bottom hole assembly of the bottom hole assembly plan with respect to its physical compatibility with the well trajectory.

4. The method of claim 3 comprising: the determining a coherency metric that indicates that the bottom hole assembly is physically incompatible with a bend of the well trajectory.

5. The method of claim 1 wherein the determining coherency metrics comprises determining at least one metric that characterizes drilling fluid of the fluid plan with respect to its physical compatibility with the well trajectory as the well trajectory is being drilled via a bottom hole assembly of the bottom hole assembly plan.

6. The method of claim 5 comprising: the determining a coherency metric that indicates that the drilling fluid is physically incompatible with removable of cuttings in at least a portion of the well trajectory as the well trajectory is being drilled via the bottom hole assembly of the bottom hole assembly plan.

7. The method of claim 1 comprising: storing the one or more messages to a data storage device.

8. The method of claim 1 comprising: receiving information acquired at a the wellsite during execution of at least a portion of the well plan.

9. The method of claim 8 comprising: issuing one or more calls for adjustment of one or more portions of the well plan based at least in part on the information.

10. The method of claim 1 comprising, responsive to execution of at least a portion of the well plan, calling for automation of one or more operations at the wellsite via at least one of the one or more automation mechanisms of the well drilling system.

11. The method of claim 1 wherein the issuing comprising calling for rendering of at least one graphic to a graphical user interface that indicates one or more adjustments to be made to one or more of the well trajectory, the fluid plan, and the bottom hole assembly plan.

12. A system comprising: one or more processors; memory operatively coupled to the one or more processors; and processor-executable instructions stored in the memory and executable by at least one of the processors to instruct the system to asynchronously receive a well trajectory as part of a well plan, a fluid plan as part of the well plan and a bottom hole assembly plan as part of the well plan wherein the well trajectory is based at least in part on information associated with a geologic environment, wherein the fluid plan is associated with a first network address, wherein the bottom hole assembly plan is associated with a second network address, and wherein the first network address and the second network address differ, asynchronously determine coherency metrics as to dependencies between the well trajectory, the fluid plan and the bottom hole assembly plan, based at least in part on the coherency metrics indicating a lack of coherency, issue one or more messages that call for adjusting one or more of the well trajectory, the fluid plan and the bottom hole assembly plan, repeat the asynchronously determining coherency metrics after receipt of one or more of the adjusted well trajectory, the adjusted fluid plan and the adjusted bottom hole assembly plan; and based at least in part on the coherency metrics of the repeating indicating coherency, output the well plan wherein the well plan calls for automation of one or more operations at a wellsite via one or more automation mechanisms of a well drilling system.

13. The system of claim 12 comprising: a communication framework that issues the one or more messages from the system to one or more network addresses.

14. The system of claim 12 comprising processor-executable instructions stored in the memory and executable by at least one of the processors to instruct the system to receive information acquired at a wellsite during execution of at least a portion of the well plan and to issue one or more calls for adjustment of one or more portions of the well plan based at least in part on the information.

15. The system of claim 12 comprising processor-executable instructions stored in the memory and executable by at least one of the processors to instruct the system to, responsive to execution of at least a portion of the well plan, call for automation of one or more operations at the wellsite via at least one of the one or more automation mechanisms of the well drilling system.

16. One or more non-transitory computer-readable storage media comprising computer-executable instructions executable to instruct a computing system to: asynchronously receive a well trajectory as part of a well plan, a fluid plan as part of the well plan and a bottom hole assembly plan as part of the well plan wherein the well trajectory is based at least in part on information associated with a geologic environment, wherein the fluid plan is associated with a first network address, wherein the bottom hole assembly plan is associated with a second network address, and wherein the first network address and the second network address differ; asynchronously determine coherency metrics as to dependencies between the well trajectory, the fluid plan and the bottom hole assembly plan; based at least in part on the coherency metrics indicating a lack of coherency, issue one or more messages that call for adjusting one or more of the well trajectory, the fluid plan and the bottom hole assembly plan; repeat the asynchronously determining coherency metrics after receipt of one or more of the adjusted well trajectory, the adjusted fluid plan and the adjusted bottom hole assembly plan; and based at least in part on the coherency metrics of the repeating indicating coherency, output the well plan wherein the well plan calls for automation of one or more operations at a wellsite via one or more automation mechanisms of a well drilling system.

17. The one or more non-transitory computer-readable storage media of claim 16 comprising computer-executable instructions executable to instruct a computing system to issue the one or more messages from the computing system to one or more network addresses.

18. The one or more non-transitory computer-readable storage media of claim 16 comprising computer-executable instructions executable to instruct a computing system to issue the one or more messages via an instant messaging communication framework.

19. The one or more non-transitory computer-readable storage media of claim 16 comprising computer-executable instructions executable to instruct a computing system to receive information acquired at a wellsite during execution of at least a portion of the well plan and to issue one or more calls for adjustment of one or more portions of the well plan based at least in part on the information.

20. The one or more non-transitory computer-readable storage media of claim 16 comprising computer-executable instructions executable to instruct a computing system to, responsive to execution of at least a portion of the well plan, call for automation of one or more operations at the wellsite via at least one of the one or more automation mechanisms of the well drilling system.

* * * * *